(12) United States Patent
Roe et al.

(10) Patent No.: US 10,419,749 B2
(45) Date of Patent: Sep. 17, 2019

(54) HOST-INDEPENDENT VHF-UHF ACTIVE ANTENNA SYSTEM

(71) Applicant: Ethertronics, Inc., San Diego, CA (US)

(72) Inventors: Michael Roe, San Diego, CA (US);
John Shamblin, San Diego, CA (US);
Vahid Manian, San Diego, CA (US);
Dhaval Bhavnagari, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 16/007,291

(22) Filed: Jun. 13, 2018

(65) Prior Publication Data
US 2018/0367791 A1 Dec. 20, 2018

Related U.S. Application Data

(60) Provisional application No. 62/522,111, filed on Jun. 20, 2017.

(51) Int. Cl.
*H04N 17/04* (2006.01)
*H01Q 1/24* (2006.01)
(Continued)

(52) U.S. Cl.
CPC ............ *H04N 17/04* (2013.01); *H01Q 1/24* (2013.01); *H01Q 1/36* (2013.01); *H01Q 1/38* (2013.01);
(Continued)

(58) Field of Classification Search
CPC .......... H04N 17/04; H04N 5/50; H01Q 5/321; H01Q 5/328; H01Q 5/378; H01Q 5/385;
(Continued)

(56) References Cited

U.S. PATENT DOCUMENTS 3,454,950 A 7/1969 Grant et al.
3,475,759 A 10/1969 Winegard
(Continued)

FOREIGN PATENT DOCUMENTS

JP 60083430 A * 5/1985 ............... H04B 1/18
WO WO03096474 11/2003

OTHER PUBLICATIONS

PCT International Search Report and Written Opinion for corresponding PCT Application No. PCT/US2018/038032, dated Oct. 2, 2018, 10 pages.

*Primary Examiner* — Michael Lee
(74) *Attorney, Agent, or Firm* — Dority & Manning, P.A.

(57) ABSTRACT

An antenna system for use with a media device is provided. The antenna system includes a multi-mode active antenna configurable to operate in a plurality of modes. Each mode of the plurality of has a distinct radiation pattern. The antenna system includes a supplemental tuner that is separate from a primary tuner associated with the media device. The antenna system includes a switching device movable between at least two positions to selectively couple the active antenna to the supplemental tuner. When the switching device is in a first position, the active antenna is coupled to the supplemental tuner. When the switching device is in a second position, the active antenna is coupled to the media device.

19 Claims, 14 Drawing Sheets

(51) Int. Cl.

| | | |
|---|---|---|
| *H01Q 5/378* | (2015.01) | |
| *H01Q 1/36* | (2006.01) | |
| *H01Q 1/38* | (2006.01) | |
| *H01Q 1/48* | (2006.01) | |
| *H01Q 9/14* | (2006.01) | |
| *H01Q 21/30* | (2006.01) | |
| *H01Q 5/328* | (2015.01) | |
| *H01Q 5/385* | (2015.01) | |
| *H01Q 9/42* | (2006.01) | |
| *H01Q 21/28* | (2006.01) | |
| *H01Q 5/321* | (2015.01) | |
| *H04N 5/50* | (2006.01) | |

(52) U.S. Cl.
 CPC ............... *H01Q 1/48* (2013.01); *H01Q 5/321* (2015.01); *H01Q 5/328* (2015.01); *H01Q 5/378* (2015.01); *H01Q 5/385* (2015.01); *H01Q 9/14* (2013.01); *H01Q 9/42* (2013.01); *H01Q 21/28* (2013.01); *H01Q 21/30* (2013.01); *H04N 5/50* (2013.01)

(58) Field of Classification Search
 CPC .. H01Q 1/24; H01Q 1/35; H01Q 1/38; H01Q 1/48; H01Q 9/14; H01Q 9/42; H01Q 21/28; H01Q 21/30
 USPC ........................................................ 348/192
 See application file for complete search history.

(56) References Cited

U.S. PATENT DOCUMENTS

| | | | |
|---|---|---|---|
| 5,122,878 A | * | 6/1992 | Heigl ..................... H03J 5/244 |
| | | | 348/725 |
| 5,257,106 A | * | 10/1993 | Maruoka ................. H04N 5/50 |
| | | | 348/556 |
| 6,061,025 A | | 5/2000 | Jackson et al. |
| 6,765,536 B2 | | 7/2004 | Phillips et al. |
| 6,987,493 B2 | | 1/2006 | Chen |
| 7,068,234 B2 | | 6/2006 | Sievenpiper |
| 7,215,289 B2 | | 5/2007 | Harano |
| 7,830,320 B2 | | 11/2010 | Shamblin |
| 7,911,402 B2 | | 3/2011 | Rowson et al. |
| 8,362,962 B2 | | 1/2013 | Rowson et al. |
| 8,446,318 B2 | | 5/2013 | Ali et al. |
| 8,648,755 B2 | | 2/2014 | Rowson et al. |
| 8,717,241 B2 | | 5/2014 | Shamblin et al. |
| 9,065,496 B2 | | 6/2015 | Rowson et al. |
| 9,231,669 B2 | | 1/2016 | Desclos et al. |
| 9,240,634 B2 | | 1/2016 | Rowson et al. |
| 9,425,497 B2 | | 8/2016 | Pajona et al. |
| 9,439,151 B2 | | 9/2016 | Zhu et al. |
| 9,479,242 B2 | | 10/2016 | Desclos et al. |
| 9,590,703 B2 | | 3/2017 | Desclos et al. |
| 9,755,305 B2 | | 9/2017 | Deslos et al. |
| 9,755,580 B2 | | 9/2017 | Desclos et al. |
| 2002/0036718 A1 | | 3/2002 | Lee |
| 2006/0050179 A1 | | 3/2006 | Kang |
| 2008/0305750 A1 | | 12/2008 | Alon et al. |
| 2010/0033398 A1 | * | 2/2010 | Jung ........................ H01Q 1/38 |
| | | | 343/860 |
| 2011/0175791 A1 | | 7/2011 | Ozdemir et al. |
| 2012/0157029 A1 | * | 6/2012 | Matsuura ............. H04H 20/106 |
| | | | 455/253.2 |
| 2013/0109327 A1 | | 5/2013 | Matsumori et al. |
| 2017/0133764 A1 | | 5/2017 | Tinaphong |
| 2018/0175503 A1 | | 6/2018 | Liu |

\* cited by examiner

| CHANNEL | DETECTION STATUS 710 | MODE 1 - CQI | MODE 2 - CQI | ... | MODE N - CQI | CHANNEL WEIGHT 720 |
|---|---|---|---|---|---|---|
| 1 | NO | 0 | 0 | | 0 | 0 |
| 2 | YES | 28 | 29 | | 29 | 0.25 |
| 3 | YES | 15 | 17 | | 16 | 1 |
| ⋮ | | | | | | |
| M | YES | 13 | 18 | | 17 | 1 |
| | | $S_n = 125$ | $S_n = 131$ | | $S_n = 127$ | |

HOST-INDEPENDENT VHF-UHF ACTIVE ANTENNA SYSTEM

REFERENCE TO RELATED APPLICATION

This application claims priority to U.S. Provisional Application No. 62/522,111, filed on Jun. 20, 2017, titled "HOST-INDEPENDENT VHF-UHF ACTIVE ANTENNA SYSTEM," which is incorporated herein by reference.

FIELD

The present disclosure relates generally to antenna systems for use with media devices (e.g., television), for instance, in the VHF and/or UHF bands.

BACKGROUND

Antennas for television reception, otherwise known as over the air (OTA) antennas, are well known and routinely used to receive television broadcast signals. Televisions generally include a built-in tuner or an external tuner (e.g., set top box). The OTA antenna can be connected to the tuner (e.g., built-in or external). In some instances, the OTA antenna can be configured to amplify OTA signals. These OTA antenna are useful in rural settings where incoming signals require amplification.

Although cable television services have displaced the need for OTA antennas, consumers are now opting to replace cable television services with more cost-effective internet-based streaming services, such as Hulu and Netflix. However, one perceived disadvantage of internet-based streaming services relates to the inability to watch local programming (e.g., local news) provided by local broadcast stations. Since OTA antennas can receive OTA signals associated with local programming, consumers of internet-based streaming services are opting to invest in OTA antennas.

SUMMARY

Aspects and advantages of embodiments of the present disclosure will be set forth in part in the following description, or may be learned from the description, or may be learned through practice of the embodiments.

One example aspect of the present disclosure is directed to an antenna system for use with a media device. The antenna system includes a multi-mode active antenna. The multi-mode active antenna is configurable to operate in a plurality of modes. Each mode of the plurality of modes has a distinct radiation pattern. The antenna system further includes a supplemental tuner and a switching device. The switching device is movable between at least two positions. When the switching device is in a first position, the active antenna is coupled to the supplemental tuner. When the switching device is in a second position, the active antenna is coupled to the media device.

Another example aspect of the present disclosure is directed to a method for configuring the antenna system for use with a media device. The method can include coupling the active antenna to the supplemental tuner via the switching device. The method can include obtaining one or more metrics while the active antenna is coupled to the supplemental tuner. The one or more metrics can be indicative of performance of the active antenna in each of the plurality of modes. The method can include determining a selected operating mode for the active antenna based, at least in part, on the one or more metrics. The method can include configuring the active antenna to operate in the selected operating mode.

Yet another example aspect of the present disclosure is directed to an active antenna. The active antenna can include a substrate. The active antenna can include a first antenna positioned on the substrate adjacent to a ground plane. The first antenna can be configured for multiple resonances in the UHF and VHF bands. The active antenna can include a first parasitic element positioned adjacent to the first antenna. The active antenna can include a first switch coupled between the first parasitic element and the ground plane. The first switch can be configured to open-circuit, short-circuit, or reactively load the first parasitic element. The active antenna can include a second antenna positioned on the substrate adjacent to the ground plane. The second antenna can be configured for multiple resonances in the UHF and VHF bands. The active antenna can include a second parasitic element positioned adjacent to the second antenna. The active antenna can include a second switch coupled between the second parasitic element and the ground plane. The second switch can be configured to open-circuit, short-circuit, or reactively load the second parasitic element. In some implementations, an arm of the first antenna can be connected to an arm of the second antenna.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 depicts a database implemented to determine a selected mode of operation for an active antenna of an antenna system according to example embodiments of the present disclosure;

DETAILED DESCRIPTION

Figure 1:
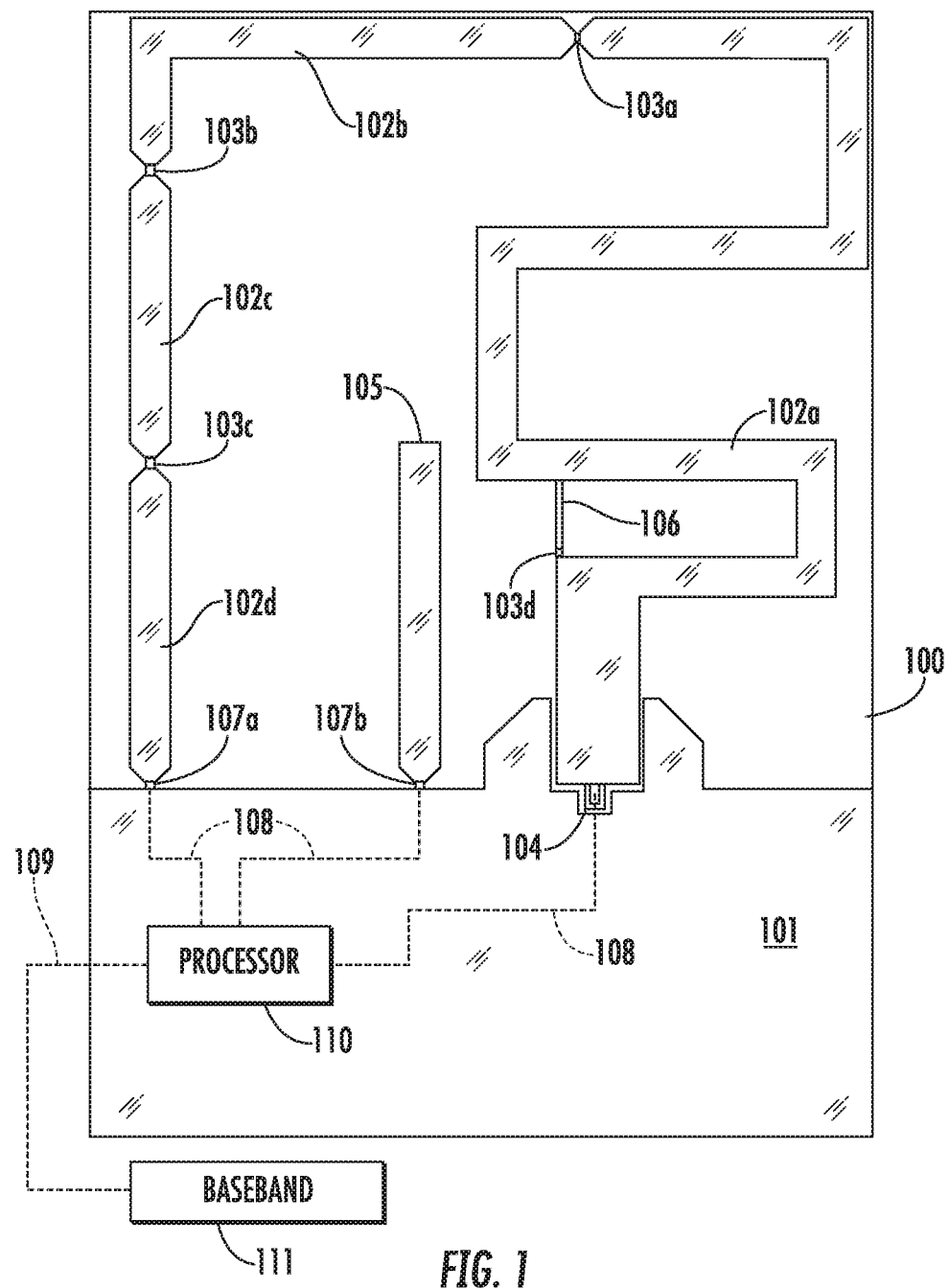
FIG. 1 depicts an active antenna according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna system for use with a media device, such as a television. The antenna system can include a multi-mode active antenna configurable to operate in a plurality of modes associated with the VHF and/or UHF bands. Each mode of the plurality of modes can have a distinct radiation pattern. The antenna system can include a supplemental tuner that is separate from a primary tuner associated with the media device. The antenna system can include a switching device movable between at least two positions. When the switching device is in a first position, the multi-mode active antenna is coupled to the supplemental tuner. When the switching device is in a second position, the multi-mode antenna is coupled to the media device. As will be discussed below in more detail, the active antenna can be configured in a selected mode (e.g., optimal mode or near optimal mode) of operation when switch is in the first position (e.g., the active antenna is coupled to the supplemental tuner).

In some implementations, the antenna system includes one or more controllers. The one or more controllers can be configured to obtain one or more metrics while the switching device is in the first position. The one or more metrics can indicate performance of the active antenna in each of the plurality of modes. The one or more controllers can be further configured to determine a selected mode of operation for the active antenna based, at least in part, on the one or more metrics. The one or more controllers can be further configured to configure the active antenna to operate in the selected mode of operation.

In some implementations, the one or more controllers can be configured to determine a channel quality indicator (CQI) for one or more channels detected while the antenna is operating in a given mode. The one or more controllers can be further configured to determine a mode score for each of the plurality of modes. More specifically, the mode score for a given mode can be based, at least in part, on the CQI. The controller(s) can be configured to determine the selected mode of operation based, at least in part, on the mode scores determined for each of the plurality of modes. For instance, the selected mode of operation can correspond to the mode having the highest mode score.

The antenna system according to the present disclosure provides numerous technical benefits. For instance, the active antenna can be selectively coupled to the supplemental tuner to determine a desired mode of operation for the active antenna without accessing one or more signals generated by a primary tuner associated with the media device. In this manner, the antenna system of the present disclosure can be used with any type of media device.

Referring now to the FIGS., FIG. 1 depicts an active UHF/VHF antenna formed on a substrate 100. The active UHF/VHF antenna includes an antenna element 102a positioned adjacent to a ground plane 101. In some implementations, the antenna element 102a can be coupled to one or more of a first conductor 102b, a second conductor 102c, and a third conductor 102d. As shown, a first component 103a can be positioned between the antenna element 102a and the first conductor 102b. In some implementations, the first component 103a can include a first filter (e.g., high pass filter) configured to pass VHF1 and VHF2 signals to the first conductor 102b.

In some implementations, a second component 103b can be disposed between the first conductor 102b and the second conductor 102c. More specifically, the second component 103b can include a second filter (e.g., high pass filter) configured to pass VHF1 signals. In some implementations, a third component 103c can be disposed between the second conductor 102c and the third conductor 102d. More specifically, the third component 103c can include a third filter. In this manner, the antenna element 102a, the first conductor 102b, the second and subsequent conductors 102c and 102d can form an antenna with multiple resonances. More specifically, up to "n" conductors can each be linked with a component, plurality of components, or filter disposed between the $n^{th}$ conductor and $(n-1)^{th}$ conductor. The $n^{th}$ component(s) or filter being configured to pass one or more desired signals and block unwanted signals.

In some implementations, the third conductor 102d is coupled to the ground plane 101 at a first multi-port switch 107a. In this manner, each port of the first multi-port switch 107a can be configured as an open-circuit, a short-circuit, or can be configured to couple a reactive load to the third conductor 102d. As a result, the first multi-port switch 107a is capable of adjusting a reactance associated with the antenna with multiple resonances, and/or can be used to open/short the third conductor to ground. The first multi-port switch 107a provides a first means for actively controlling the antenna function.

In some implementations, each of the first, second, and third filters 103a, 103b, and 103c, respectively, can be configured as a passive reactance component or "passive component" such as a capacitor or inductor. Alternatively, each of the first, second, and third filters 103a, 103b, and 103c can be configured as a circuit comprising two or more passive components, such as an LC circuit (inductor and capacitor). In some implementations, each of the first, second, and third filters 103a, 103b, and 103c can be configured as a filter, such as a low pass filter. Those with skill in the art will be able to appreciate the various components and arrangements of components which will filter out signals at each of the "filters" 103a thru 103c.

In some implementations, the first filter 103a can include an LC circuit. Alternatively or additionally, the second filter 103b can include a low pass filter. In some implementations, the third filter 103c can include a passive inductor. In yet another example, one or more of the first, second, and third filter 103a, 103b, 103c can include a tunable component, such as a tunable capacitor, tunable inductor, or other tunable component known by those having skill in the art.

In some implementations, the antenna of FIG. 1 can include a parasitic element 105 positioned adjacent to the antenna element 102a. More specifically, the parasitic element 105 can be coupled to the ground plane 101 via a second multi-port switch 107b. The second multi-port switch 107b can be configured to open-circuit, short-circuit, or reactively load the parasitic element. These changes to the reactive loading of the parasitic element 105 can induce a radiation pattern change about the antenna element and conductors extending therefrom. In this regard, the antenna assembly as a whole (antenna element, conductors, parasitic element, ground plane, etc.) can be configured for active beam steering for changing a radiation pattern mode of the antenna.

In some implementations, the antenna element 102a is further shown with a bypass junction 106 for providing a path for high frequency signals. A fourth filter 103d is provided to block low frequency signals. As shown, the fourth filter 103d is shown with a passive capacitor. However, it should be appreciated that a tunable capacitor can be similarly implemented between the feed 104 and the bypass junction 106.

In some implementations, each of the first multi-port switch 107a; second multi-port switch 107b, and the feed 104 may be coupled to a microprocessor 110 via transmission lines 108 extending therebetween as shown. The microprocessor 110 can be configured to communicate one or more signals to each of the first and second multi-port switches 107a, 107b for controlling a switch state or activating switch ports. Additionally, the microprocessor 110 can be configured to control a matching circuit associated with the antenna feed. The matching circuit may be incorporated into the microprocessor 110. Alternatively, the matching circuit can be positioned outside the processor 100. In some implementations, the matching circuit includes one or a plurality of passive and/or active reactance components, such as capacitors, inductors, and tunable variants thereof as known by those with skill in the art. As will be discussed in more detail, the processor 110 can be configured to determine a mode for configuring the active UHF/VHF antenna. Additionally, the processor 110 can configured to send associated control signals to configure the antenna in the desired mode.

In some implementations, the microprocessor 110 is generally coupled to a television receiver/baseband 111 via one or more control lines 109. As a user selects a channel, the receiver 111 communicates the desired channel information to the processor 110. In example embodiments, the processor 110 can be configured to determine a selected mode of operation for the antenna element 102a. Additionally, the processor 110 can be configured to configure the antenna element 102a in the selected mode of operation. In example embodiments, the processor 110 can determine the selected mode of operation based, at least in part, on one or more metrics obtained while the antenna element 102a operates in each of the plurality of modes. For example, the metric(s) can include a received signal strength indicator (RSSI) value associated with broadcast signals the antenna element 102a receives while operating in each of the plurality of modes.

Figure 2:
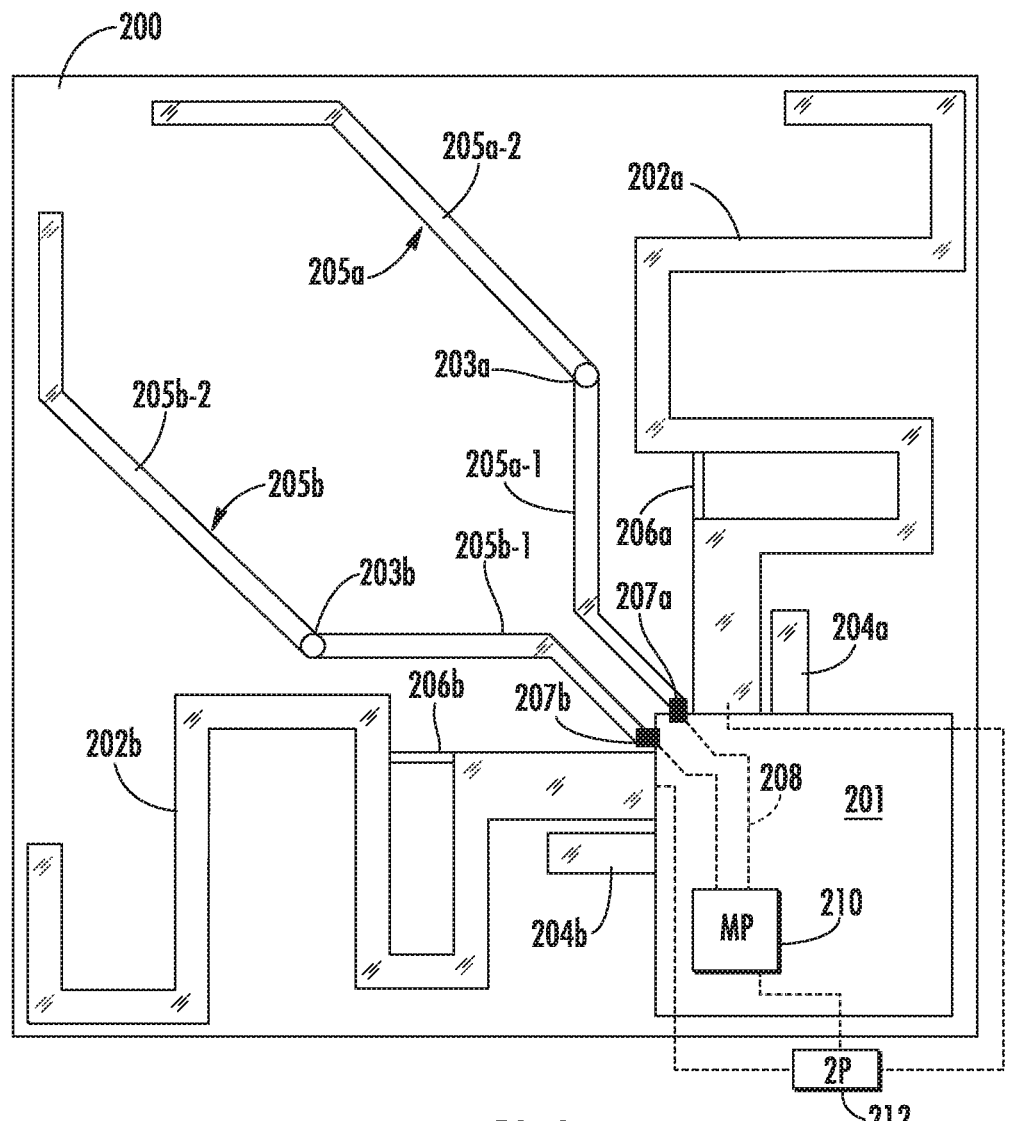
FIG. 2 depicts an active antenna according to example embodiments of the present disclosure.

Referring now to FIG. 2, an active UHF/VHF antenna can include a ground plane 201, a first antenna element 202a, a second antenna element 202b, a first parasitic element 205a, and a second parasitic element 205b. As shown, each of the ground plane 201, the first antenna element 202a, the second antenna element 202b, the first parasitic element 205a, and the second parasitic element 205b can be formed on a substrate 200. It should be appreciated that the substrate 200 can be comprised of any suitable material. For example, the substrate 200 can be comprised of a rigid FR4 substrate. As another example, the substrate 200 can be comprised of a flexible polyimide.

In some implementations, the ground plane 201 is formed at a corner of the substrate 200. As shown, the first antenna element 202a can extend vertically from the ground plane 201 in a first direction (out of the page). Alternatively or additionally, the second antenna element 202b can extend horizontally from the ground plane 201 in a second direction. More specifically, the first antenna element 202a and the second antenna element 202b can be oriented perpendicular to one another.

The first antenna element 202a and the second antenna element 202b can be configured so that the first antenna element 202a is horizontally polarized, and the second antenna element 202b is vertically polarized. The first and second antenna elements 202a, 202b can be further configured as mirror opposites. Alternatively, the first and second antenna elements 202a, 202b can be configured to oppose one another.

In some implementations, the first antenna element 202a can include a first bypass junction 206a extending between two points along a first bent portion of the first antenna element 202a. Alternatively or additionally, the second antenna element 202b can include a second bypass junction 206b extending between two points along a first bent portion of the second antenna element 202b. A passive or tunable reactive component can be implemented at either or both of the first and second bypass junctions 206a, 206b.

In some implementations, the ground plane 201 can include a first ground plane extension 204a positioned adjacent to the first antenna element 202a. Alternatively or additionally, the ground plane 201 can include a second ground plane extension 204b positioned adjacent to the second antenna element 202b. Each of the first and second ground plane extensions 204a, 204b can be configured to impedance match the adjacent antenna structures.

In some implementations, a two-port switch 212 can be implemented with connection to each of the first and second antenna elements 202a; 202b, respectively. In this manner, various modes of operation may be provided. For instance, the two-port switch 212 can be configured to provide a first mode utilizing the first antenna element 202a, a second mode utilizing the second antenna element 202b, and a third mode utilizing a combined signal of both the first and second antenna elements 202a and 202b.

In some implementations, a first parasitic element 205a is formed by a first portion 205a-1 and a second portion 205a-2. More specifically, a first filter 203a can be disposed between the first and second portions 205a-1, 205a-2 of the first parasitic element 205a. As shown, the first parasitic element 205a can be positioned adjacent to the first antenna element 202a. Alternatively or additionally, a first multi-port switch 207a can be coupled between the first parasitic element 205a and the ground plane 201. The first multi-port switch 207a can be configured to open-circuit, short-circuit, and/or reactively load the first parasitic element 205a.

In some implementations, a second parasitic element 205b is formed by a first portion 205b-1 and a second portion 205b-2. More specifically, a second filter 203b can be disposed between the first and second portions 205b-1, 205b-2 of the second parasitic element 205b. As shown, the second parasitic element 205b can be positioned adjacent to the second antenna element 202b. In some implementations, a second multi-port switch 207b can be coupled between the second parasitic element 205b and the ground plane 201. The second multi-port switch 207b can be configured to open-circuit, short-circuit, and/or reactively load the second parasitic element 205b.

In some implementations, as shown in FIG. 2, the first and second parasitic elements 205a, 205b can be arranged to oppose one another. However, it should be appreciated that the first and second parasitic elements 205a, 205b oriented in any suitable manner without deviating from the scope of the present disclosure.

As shown, each of the first and second multi-port switches 207a; 207b can be coupled to a microprocessor 210 via control lines 208 extending therebetween. In some implementations, the microprocessor 210 can be configured to couple with a television receiver. In a similar manner, a user can select a channel from the television control, and the television receiver or related chipset can then send a request to the microprocessor 210 of the antenna. The microprocessor 210 can be configured to determine the selected mode of operation for the antenna and configure each of the multi-port switches 207a, 207b and other tunable components (if any) so that the antenna operates in the selected mode of operation.

Figure 3A:
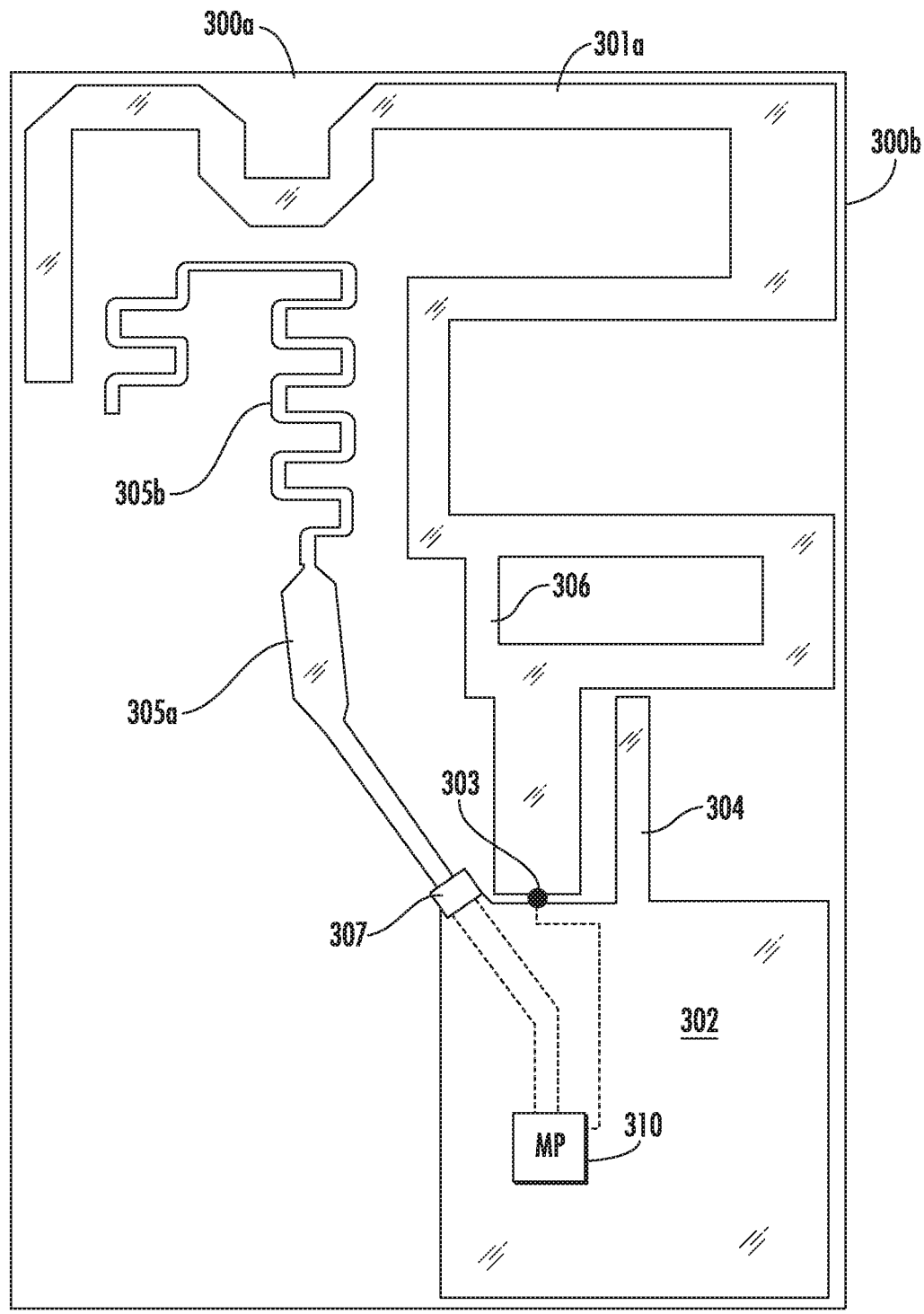
FIG. 3A depicts a plan view of an active antenna according to example embodiments of the present disclosure.
Figure 3B:
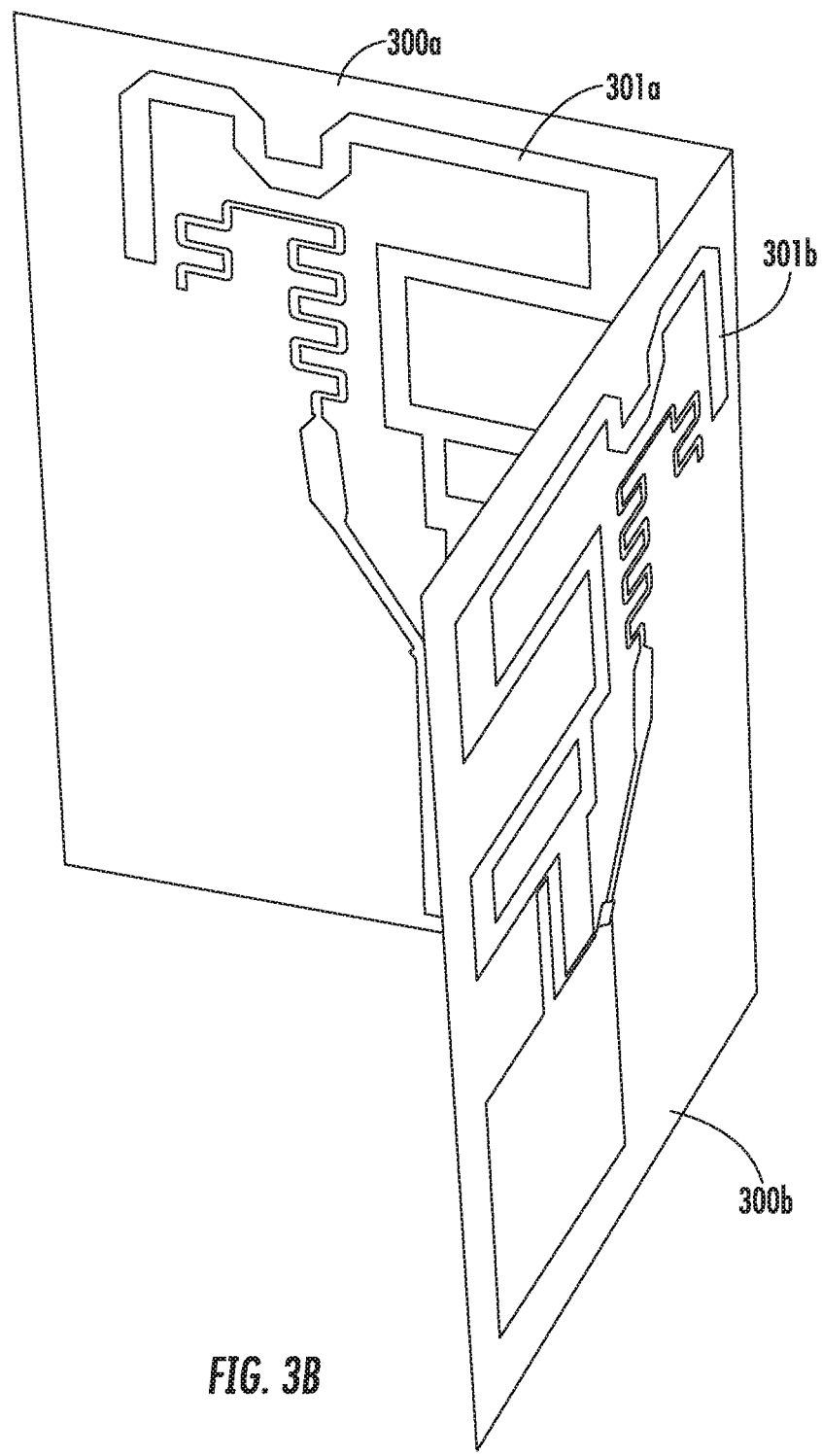
FIG. 3B depicts a perspective view of an active antenna according to example embodiments of the present disclosure.

Referring now to FIGS. 3A-B, a three-dimensional antenna assembly includes a first planar substrate portion 300a having a first active UHF/VHF antenna 301a thereon, and a second planar substrate portion 300b having a second active UHF/VHF antenna 301b thereon. The first active UHF/VHF antenna 301a can include any structure as described herein, or a modification thereof. However, for illustrative purposes, the first active antenna 301a is shown as having a first antenna element 301a disposed adjacent to a first ground plane 302. The first ground plane 302 is shown with an optional first ground plane extension 304 for impedance matching the first active antenna 301a. In some embodiments, signals can be communicated between the first antenna element 301a and the receiver 111 (FIG. 1) via a first feed 303. As shown, a first bypass junction 306 can provide a distinct path for high-frequency signals. Alternatively or additionally, a first parasitic element 305 with a first section 305a and a second section 305b is shown. The first section 305a may optionally be separated from the second section 305b by one or more first passive and/or active components, or first filters (not shown).

In some implementations, the first parasitic element 305 can be coupled to the first ground plane at a first multi-port switch 307a. The first multi-port switch 307a can comprise any number of ports, or "n"-ports, wherein each port is individually selected to open-circuit, short circuit, or reactively load the first parasitic element. A first microprocessor 310 is shown coupled to the first multi-port switch 307a. The first microprocessor 310 can receive signals from the baseband 111 (FIG. 1) or a receiver circuit in a media device. More specifically, the signals can include information related to the user-selected channel. In some implementations, the first microprocessor 310 can be configured to determine a selected mode of the first UHF/VHF antenna 301a for receiving the desired channel. The first microprocessor 310 can be configured to sample all possible modes of the first active antenna 301a and select the mode exhibiting the optimal metric, such as RSSI, etc. Once the mode is selected, control signals can be communicated to the first multi-port switch 307 to configure the first active antenna 301a in the desired mode.

The second planar substrate 300b is shown extending out of the page in FIG. 3A, and is configured orthogonal with respect to the first planar substrate 300a. FIG. 3B further shows the antenna of FIG. 3A from a perspective view in which a second active UHF/VHF antenna 301b is positioned on the second planar substrate 300b. In some implementations, the first microprocessor 310 can be used to control both the first and second active antennas 301a and 301b. Alternatively, multiple microprocessors may be implemented to control the first and second antennas 301a and 301b. In some embodiments, the second antenna 301b may be oriented perpendicular with regard to the first antenna 301a. It should be appreciated, however, that the first antenna 301a and the second antenna 301b can oriented such that any suitable angle is defined therebetween. It should also be appreciated that the second antenna 301b may be a mirror image of the first antenna 301a.

Figure 4:
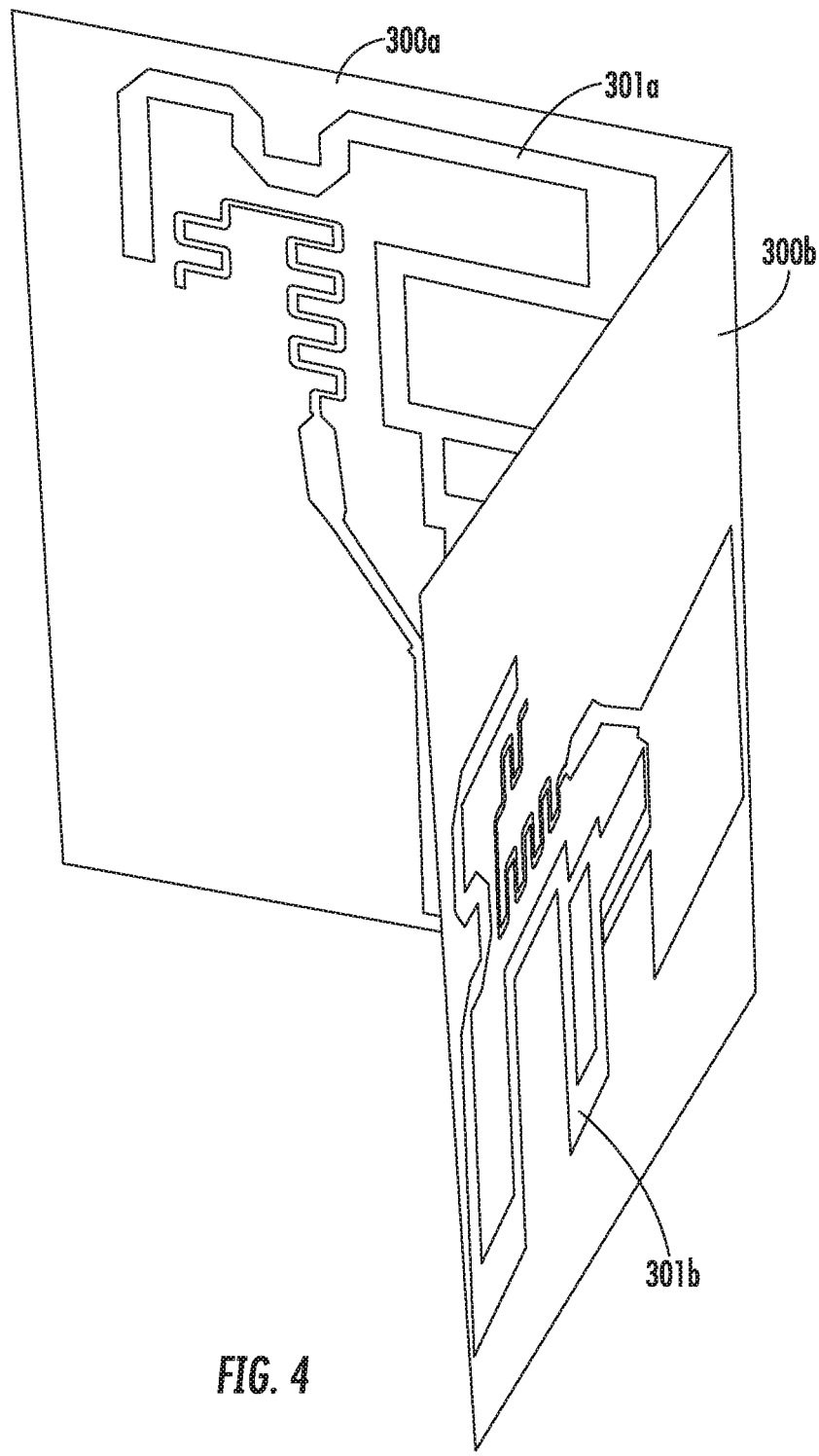
FIG. 4 depicts a perspective view of an active antenna according to example embodiments of the present disclosure.

In some embodiments, the first and second antennas 301a, 301b may oriented in the same manner. It should be appreciated that any change in orientation of the second antenna 301a with respect to the first antenna 301a may be similarly implemented as shown in FIG. 4. It should also be appreciated that the radiation pattern of the first antenna 301a, the second antenna 301b, or a combination of the first and second antennas 301a, 301b may be used for reception of OTA signals.

Figure 5:
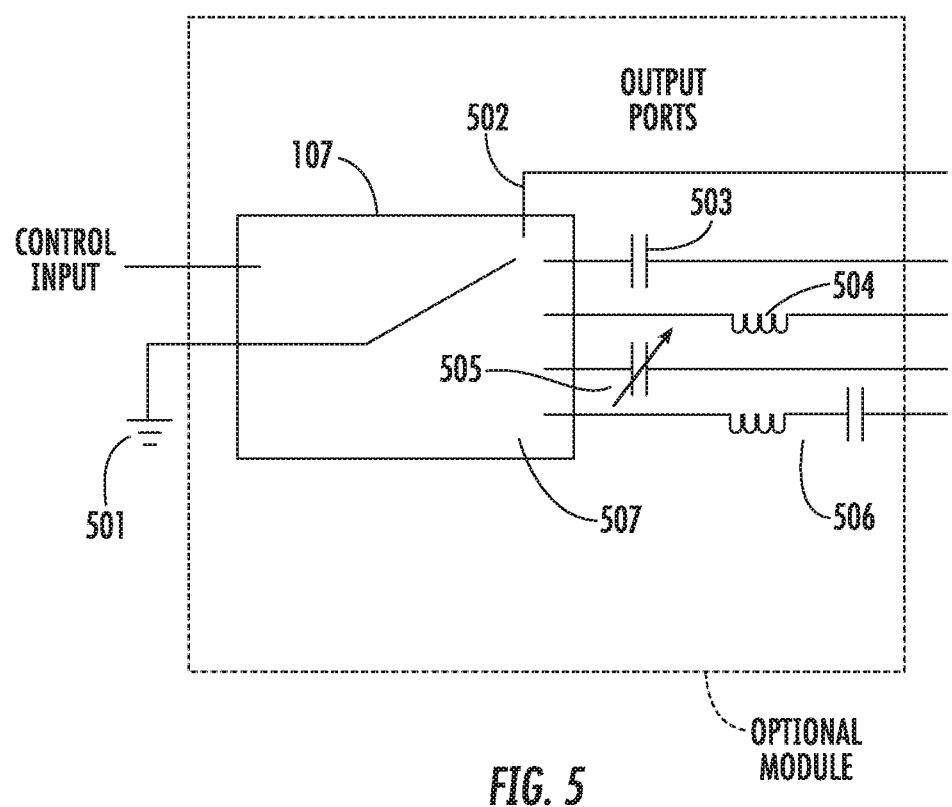
FIG. 5 depicts a multi-port switch according to example embodiments of the present disclosure.

Referring now to FIG. 5, an example of a multi-port switch 107 is provided according to example embodiments of the present disclosure. Although the multi-port switch 107 depicted in FIG. 5 includes five output ports 502, 503, 504, 505 and 506, it should be appreciated that the multi-port switch 107 can include more or fewer output ports.

The multi-port switch includes switch 107 coupled to ground 501. The switch 107 can be configured to short circuit via output port 502, reactively load via output ports 503; 504; 505; and 506, or open circuit at port 507. Port 503 shows a passive capacitor for reactively loading the antenna feature coupled to the multi-port switch 107. Port 504 shows a passive inductor for reactively loading the antenna feature coupled to the multi-port switch 107. Port 505 shows a tunable capacitor for reactively loading the antenna feature coupled to the multi-port switch 107. Port 506 shows a plurality of passive components for reactively loading the antenna feature coupled to the switch 107. Control input signals from the microprocessor are provided to the multi-port switch for configuring the switch with the selected port or path for placing the antenna in a desired mode. The switch and reactive component(s) may be configured as a circuit on the antenna substrate, or may be implemented in a unitary module, as shown.

An active antenna system will generally require some feedback in order to determine an antenna mode such that the active antenna can be configured in a desired mode. The feedback is generally processed with an algorithm and/or controller designed to identify the quality of signal in various antenna modes, such that a preferred mode may be selected for operating the active antenna.

The feedback provided to the controller of the antenna system can include a signal metric, including a channel quality indicator (CQI), such as, for example, receive power (RP), signal to noise ratio (SNR), signal-to-interference-plus-noise ratio (SINR), magnitude error ratio (MER), error vector magnitude (EVM), bit error rate (BER), block error rate (BLER), or packet error rate (PER), or other metrics known in the art.

Although signals generated by a tuner associated with a media device (e.g., television) can be sampled, doing so would necessitate use of one or more electrical components of the media device, such as one or more processors. Alternatively or additionally, the processors onboard the media device may require special programming in order to access the signals generated by the tuner. As an example, the active antenna may need to be coupled to the tuner. Additionally, the active antenna may need to be specially designed to accommodate the tuner. However, since different consumers would likely own different television models, matching of components, software and the like would be undesirable. Furthermore, although knowledge of a specific channel being viewed may be desirable, it would be difficult to produce an active antenna capable of plug and play use with generally any television unit, since, each television unit contains different circuitry and requirements.

However, the present disclosure provides a novel solution to the aforementioned problem. That is, a tuner can be implemented in the antenna system (herein "external tuner") that is distinct from the tuner enclosed within the television unit. In this regard, the external tuner is housed in the antenna system and is used to sample the OTA signals. Thus, the first tuner that is enclosed within the television unit, and the second tuner (external tuner) that is disposed in the antenna system, are each configured to receive the OTA signals; however the external tuner uses the signals received to sample a metric using an algorithm to determine a selected mode for configuring the active antenna.

Figure 6:
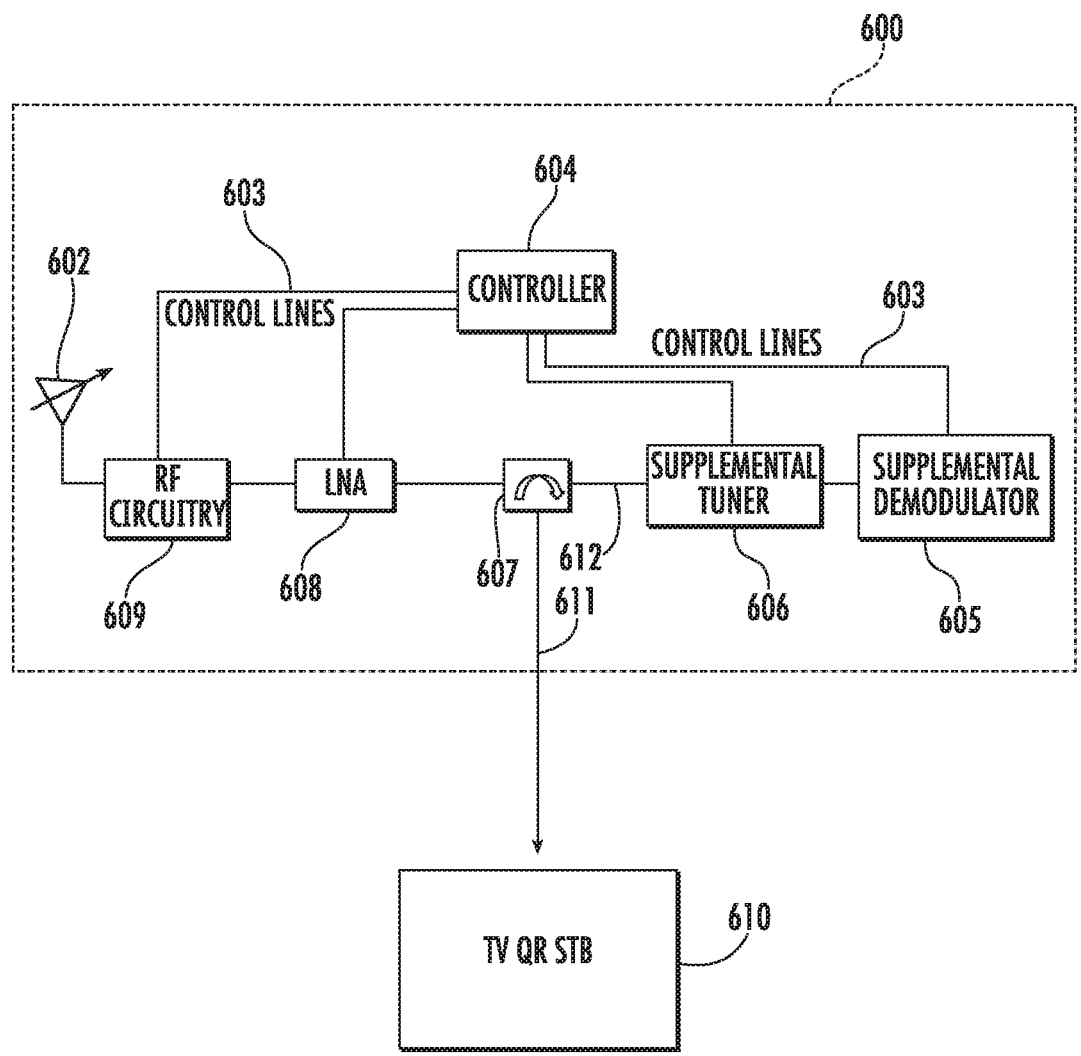
FIG. 6 depicts an antenna system according to example embodiments of the present disclosure.

Referring now to FIG. 6, a block diagram of an antenna system 600 for use with a media device 610 is provided according to example embodiments of the present disclosure. As shown, the antenna system 600 can include a multi-mode active antenna 602 configurable to operate in a plurality of modes. More specifically, each mode of the plurality of modes can have a distinct radiation pattern. In this manner, the active antenna 602 can be configured to operate in a mode that is optimal for viewing local programming. It should be appreciated that the antenna system 600 can be configured for use with any television unit or set top box and is not specific to any particular model. It should also be appreciated that the active antenna 602 of FIG. 6 can be configured as any one of the antennas discussed above with reference to FIGS. 1-4, or FIG. 13.

In some implementations, the active antenna 602 can be coupled to RF circuitry 609 of the antenna system 600. The RF circuitry 609 can include one or more circuits configured for impedance matching, mode selection of the active antenna 602, or a combination thereof. As discussed above with reference to FIGS. 1 through 4, active antennas generally include one or more parasitic elements. In some implementations, the parasitic element and/or a radiating element of the active antenna can be coupled to one or more components, such as switches, inductors, capacitors, tunable inductors, tunable capacitors, or solid state devices. Although these components can generally be included within the RF circuitry 609, it should be appreciated that the components may be located elsewhere in the system 600.

In some implementations, a signal (e.g., OTA signal) received by the active antenna 602 can be provided to a low noise amplifier (LNA) 608 of the system 600. In this manner, the signal can be amplified. As shown, the LNA 608 can provide the amplified signal to a directional coupler 607 of the system 600. The directional coupler 607 can be configured to bifurcate the amplified signal into a first bifurcated signal 611 and a second bifurcated signal 612. As shown, the first bifurcated signal 611 can be provided to a media device 610, such as a television. More specifically, the first bifurcated signal 611 can be provided to a primary tuner associated with the media device 610. In some implementations, the primary tuner can be integral with the media device 610. Alternatively, the primary tuner can be a separate device that is communicatively coupled to the media device 610 via a wired (e.g., coaxial) or wireless communication link.

In some implementations, the second bifurcated signal 612 can be provided to a supplemental tuner 606 of the system 600. It should be appreciated that the supplemental tuner 606 is separate from the primary tuner discussed above. In some implementations, the supplemental tuner 606 can provide one or more signals to a supplemental demodulator 605 of the system 600. The supplemental demodulator 605 can be configured to demodulate the signals received from the supplemental tuner 606. In this manner, the supplemental demodulator 605 can extract information (e.g., video data) associated with the signal(s).

In some implementations, the system 600 includes a controller 604. As shown, the controller 604 can be communicatively coupled to at least one of the RF circuitry 609, the LNA 608, the supplemental tuner 606, and the supplemental demodulator 605 via one or more control lines 603. In some implementations, the controller 604 can be configured to process signals output by at least one of the LNA 608, the supplemental tuner 606, and the supplemental demodulator 605. More specifically, the controller 604 can process the signals to determine a metric indicative of the quality of the signals. As will be discussed below in more detail, the controller 604 can be configured to determine a selected mode of operation for the active antenna 602 based, at least in part, on the metric. Additionally, the controller 604 can configure the active antenna 602 to operate in the selected mode. More specifically, the controller 604 can provide one or more control signals to the RF circuitry 609 via the control lines 603.

In some implementations, the active antenna 602 can initially be configured in a first mode of the plurality of modes. While the active antenna 602 is configured in the first mode, the active antenna 602 can receive one or more OTA signals that can be provided to the media device 610 and the controller 604. More specifically, the controller 604 can receive the signals via at least one of the LNA 608, the supplemental tuner 606, and the supplemental demodulator 605. In this manner, the controller 604 can obtain one or more metrics indicative of performance of the active antenna 602 while operating in the first mode. In some implementations, the controller 604 can obtain the metric(s) for each of the plurality of modes. In this manner, the controller 604 can determine which of the modes is optimal or near optimal and can configure the active antenna 602 accordingly.

In some implementations, the selected mode may be desired that achieves the maximum CQI for the most popular broadcast channels in a particular region, for example ABC, CBS, NBC, FOX, etc. In another implementation, a mode may be desired which provides optimal CQI for the most channels received by the OTA signals. In yet another implementation, mode selection can be based, at least in part, on the number of channels detected within a given mode that have a CQI above a predetermined threshold value. As will be discussed below in more detail, the controller 604 can implement various techniques to determine the selected mode of operation for the active antenna 602.

Referring now to FIG. 7, the controller 604 (FIG. 6) can be configured to populate a look-up table or database 700 with information or "data" indicative of performance of the active antenna 602 while operating in each of the plurality of modes. As will be discussed below in more detail, the controller 604 can determine a selected mode of operation for the active antenna 602 based, at least in part, on the data included in the database 700.

In some implementations, the database 700 can include a detection status 710 for channel numbers 1 through M. It should be appreciated that M is variable indicative of the total number of channels detected by the active antenna. For example, if the active antenna can detect a total of six different channels across the different modes of operation, the variable M would be assigned the numerical value "6" in the database 700. As shown in FIG. 7, the active antenna 602 (FIG. 6) cannot detect channel 1. Accordingly, the detection status 710 for channel 1 is No. In contrast, the active antenna 602 (FIG. 6) can detect channels 2, 3, and M. Accordingly, the detection status for channels 2, 3, and M is Yes.

In some implementations, the controller 604 (FIG. 6) can determine a CQI for a given channel (e.g., channels 1 through M) and a given mode (e.g., modes 1 through N) of the plurality of modes in which the active antenna 602 can operate. It should be appreciated that N is a variable indicative of the total number of modes. For example, if the active antenna 602 can operate in four different modes, the variable N would be assigned the numerical value "4". It should be appreciated that the controller 604 (FIG. 6) can determine the CQI based, at least in part, on the metric(s) obtained via signals from at least one of the LNA 608, the supplemental tuner 606, and the supplemental demodulator 605. More specifically, the metric(s) can include at least one of SNR and SINR. As shown in FIG. 7, the controller 604 (FIG. 6) can determine the CQI for channel 2 is equal to 28 when the active antenna 602 is operating in Mode 1. In contrast, the controller 604 can determine the CQI for channel 2 is equal to 29 when the active antenna 602 is operating in Mode 2.

In some implementations, a weighting factor 720 can be applied to channels 1 through M. For example, the weighting factor 720 can be determined based on the detection status 710 of a given channel. For instance, channels that cannot be detected, such as channel 1, can be assigned a weighting factor of zero. In this manner, channels whose detection status 710 is "No" cannot impact a mode score $S_n$ that is determined for each mode (e.g., Modes 1 through N). As another example, the weighting factor 720 can vary depending on a magnitude of the CQI for a given channel. For instance, the CQI for channel 2 is greater than channel 3. As such, the weighting factor 720 assigned to channel 2 can be less than the weighting factor 720 assigned to channel 3. More specifically, the channel 2 can be assigned a weighting factor 720 of a quarter of a point (e.g., 0.25), whereas channel 3 can be assigned a weighting factor 720 of one (e.g., 1). In this manner, channel 3 can be weighted more heavily than channel 3 when the mode score $S_n$ is calculated for each of the modes (e.g., Modes 1 through N).

In some implementations, the mode score $S_n$ for each of the modes (e.g., Modes 1 through N) can be determined as shown in Equation 1:

$$S_n = \sum_{m=1}^{M}(w_m \times CQI_{m,n}) \qquad \text{Equation 1}$$

In the above formula, $w_m$ corresponds to the weighting factor assigned to channels 1 through M. Additionally, $CQI_{m,n}$ corresponds to the channel quality indicator for a given channel m and mode n. Accordingly, the mode score $S_n$ for the first mode can be calculated as shown below in Equation 2:

$$S_n = (w_1 * CQI_{1,1}) + (w_2 * CQI_{2,1}) + (w_3 * CQI_{3,1}) + \ldots + (W_M * CQI_{1,N}) \qquad \text{Equation 2}$$

In some implementations, the selected mode of operation for the active antenna 602 (FIG. 6) can correspond to the mode having the highest mode score $S_n$. More specifically, the selected mode $n_{selected}$ can be determined as shown below in Equation 3:

$$n_{selected} = \arg\max_n(S_n) \qquad \text{Equation 3}$$

Figure 8:
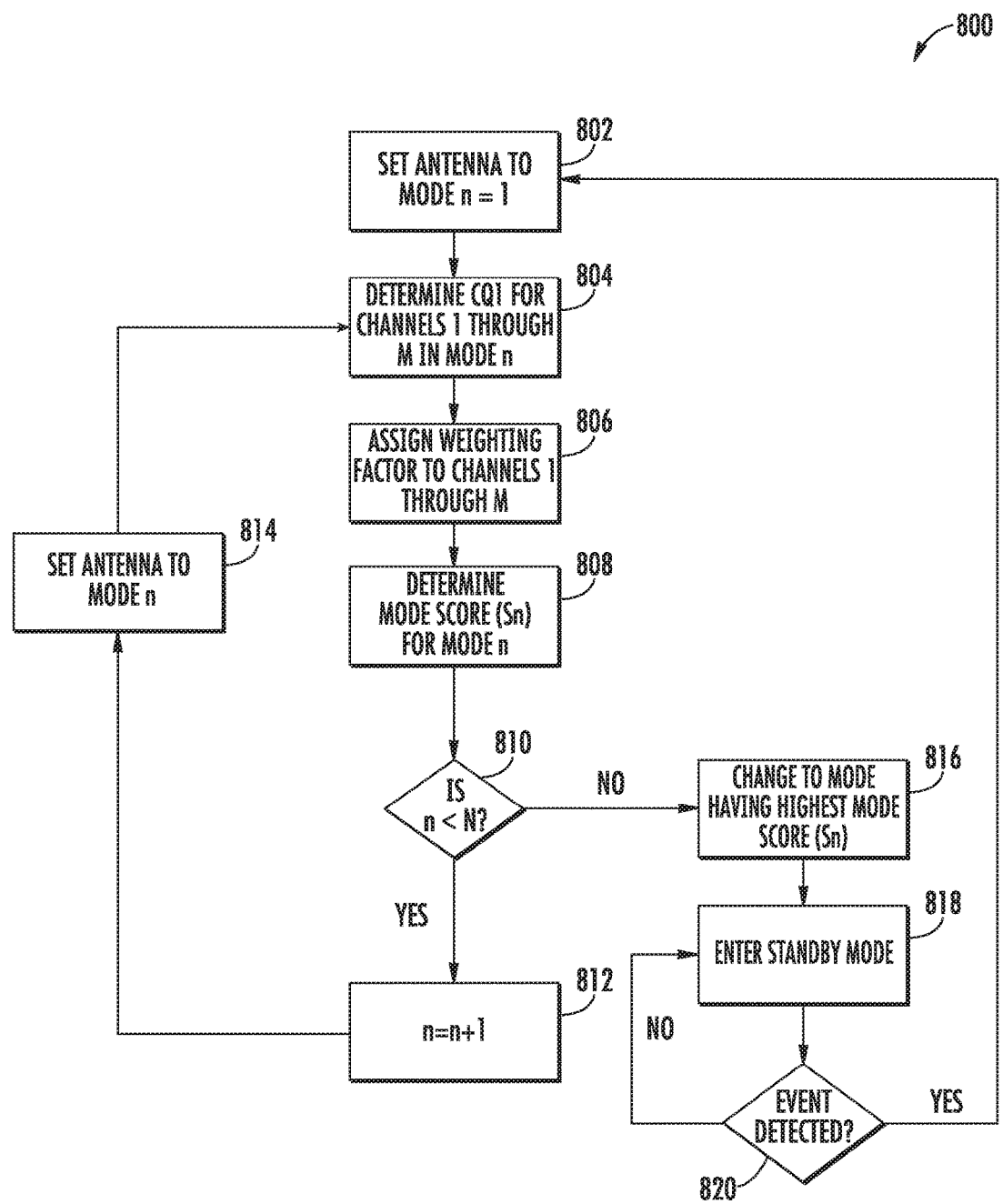
FIG. 8 depicts a method for determining a selected mode of operation for an active antenna of an antenna system according to example embodiments of the present disclosure.

Referring now to FIG. 8, a flow diagram of a method 800 for determining the selected mode of operation for an active antenna of antenna system is provided according to example embodiments of the present disclosure. The method 800 may be implemented using, for instance, the antenna system discussed above with reference to FIG. 6. FIG. 8 depicts steps performed in a particular order for purposes of illustration and discussion. Those of ordinary skill in the art, using the disclosures provided herein, will understand that various steps of the method 800 may be adapted, modified, rearranged, performed simultaneously or modified in various ways without deviating from the scope of the present disclosure.

At (802), the method 800 includes configuring the active antenna in one of N modes of operation. Additionally, a mode counter variable n can be assigned a value of 1. In some implementations, the controller can generate one or more control actions associated with configuring the active antenna in one of the modes. More specifically, the controller can communicate one or more commands over the control lines to the RF circuitry of the antenna system.

At (804), the method 800 includes determining a CQI for each channel (e.g., channels 1 through M) that is detected while the active antenna is operating in mode n. In some implementations, the controller can be configured to determine the CQI for each channel based, at least in part, on the one or more metrics associated with the signals received from at least one of the LNA, the supplemental tuner, and the supplemental decoder. More specifically, the metric(s) can include at least one of SNR and SINR.

At (806), the method 800 includes assigning a weighing factor to each channel. As discussed above, the weighting factor can be assigned based on a variety of factors. For instance, the weighting factor for a channel that is not detected by the active antenna can be assigned a weighting factor of zero. Alternatively or additionally, channels that are detected by the active antenna can be assigned a weighting factor based, at least in part, on the CQI value determined at (804). For instance, a weighting factor assigned to a channel having a CQI that is greater than a minimum value by a predetermined amount can be different than a weighting factor assigned to a channel having a CQI that is not greater than the minimum value by minimum amount. In some embodiments, the minimum value can correspond to a minimum CQI that is required to decode the signals and view content being broadcast on the channel.

At (808), the method 800 includes determining a mode score for the current mode in which the active antenna is operating. In some implementations, the controller can implement Equation 1 discussed above with reference to FIG. 7. In this manner, the controller can determine mode score for mode n.

At (810), the method 800 includes determining whether the mode variable counter is less than a total number of modes N in which the active antenna can operate. If n is less than N, the method proceeds to (812). However, if n is greater than or equal to N, the method proceeds to (816).

At (812), the method 800 includes incrementing a mode variable counter n. For instance, if the current mode of the active antenna corresponds to the first mode, the mode variable counter can be assigned a value of 1. Accordingly, at (810), the mode variable counter can be incremented according to Equation 4 shown below:

$$n = n+1 \qquad \text{Equation 4}$$

At (814), the method 800 includes reconfiguring the active antenna based, at least in part, on the mode counter variable. As an example, if the mode counter variable is equal to 2, the controller can reconfigure the active antenna to a second mode of the N different modes. In this manner, the current mode of the active antenna can be changed from the first mode to the second mode. Once the current mode of the active antenna has been reconfigured, the method reverts to (804).

At (816), the method 800 includes configuring the active antenna to operate in the selected operating mode. In some implementations, the selected operating mode can correspond to the mode (e.g., 1 through N) with the highest mode score determined at (808). Once the active antenna is configured in the selected operating mode, the method proceeds to (818).

At (818), the method 800 includes entering a standby mode until the occurrence of a detected event. In some implementations, the detected event can occur when a predetermined amount time lapses since the active antenna was configured in the selected operating mode at (816). Alternatively or additionally, the detected event can occur when metrics obtained from the signals received from at least one of the LNA, the supplemental tuner, and the supplemental demodulator indicate an amount of interference associated with the signals exceeds a threshold value. In some implementations, the detected event can occur when the controller detects a change in position (e.g., GPS coordinates) of the active antenna. It should be appreciated that the method 800 reverts to (802) in response to the occurrence of a detected event.

In some implementations, the detected event can occur when user-input is received via an input device. More specifically, the input device can include one or more mechanical interface elements (e.g., push-button) in operative communication with the controller. Alternatively or additionally, the input device can include a mobile device (e.g., smartphone, tablet, laptop, etc.) that is communicatively coupled to the controller via any suitable wired or wireless communication link.

Figure 9:
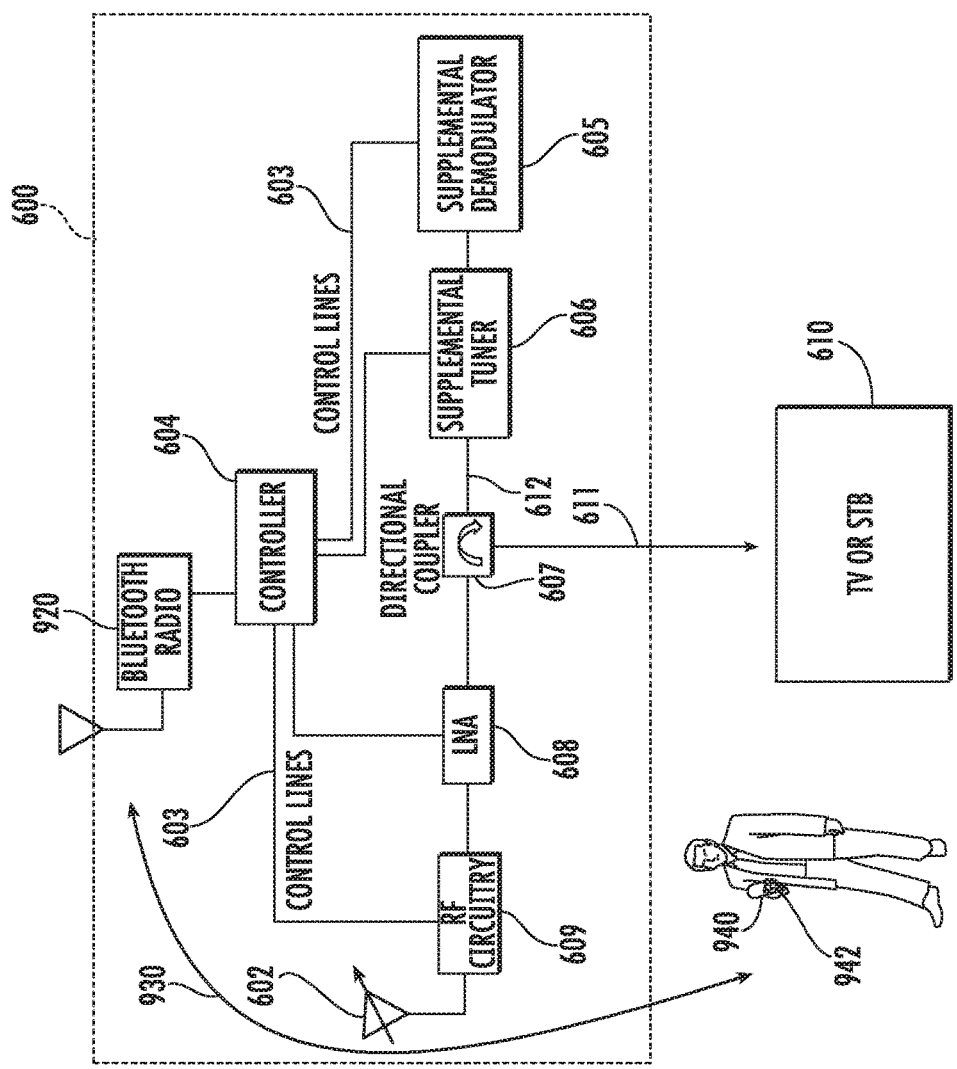
FIG. 9 depicts a block diagram of an antenna system according to example embodiments of the present disclosure.

Referring now to FIG. 9, a block diagram of an antenna system 600 is provided according to example embodiments of the present disclosure. The antenna system 600 depicted in FIG. 9 is configured in substantially the same manner as the antenna system 600 depicted in FIG. 6. For instance, the antenna system 600 in FIG. 9 can include a directional coupler 607 and a supplemental tuner 606. Accordingly, the same or similar reference numbers may be used to describe the same or similar components. However, as will be discussed below in more detail, the antenna system 600 of FIG. 9 differs from the antenna system 600 of FIG. 6 in that the antenna system 600 of FIG. 9 includes a Bluetooth module 920.

As shown, a bidirectional communication link 930 exists between the antenna system 600 and a mobile device 940. In some implementations, the mobile device 940 includes a Bluetooth module 942. In this manner, information can be exchanged between the antenna system 600 and the mobile device 940 over the bidirectional communication link 930. In some implementations, information exchanged over the bidirectional communication link 930 can include a zip code indicative of a current location of the antenna system 600. Alternatively or additionally, information exchanged over the bidirectional communication link 930 can include one or more channels that are available at the antenna location. In some implementations, information exchanged over the bidirectional communication link 930 can include a specific subset of TV channels. It should be appreciated that the antenna system 600 can be optimized to accommodate the specific subset of TV channels.

Although the bidirectional communication link 930 is discussed with reference to Bluetooth, it should be appreciated that the bidirectional communication link 930 can be implemented using any suitable communication technology. Example communication technologies can include, for instance, near-field communication, Wi-Fi (e.g., IEEE 802.11), Wi-Fi Direct (for peer-to-peer communication), Z-Wave, Zigbee, Halow, cellular communication, LTE, low-power wide area networking, VSAT, Ethernet, etc.

In some implementations, the antenna system 600 uses a built-in tuner and demodulator to collect metrics (e.g., SNR, SINR) that can be used by the controller 604 to determine a selected mode of operation for the active antenna 602. More specifically, the selected mode of operation can optimize reception across all or some of the VHF/UHF broadcast television channels in an area (e.g., region) in which the antenna system 600 is being used.

It should be appreciated that the antenna system 600 of FIG. 9 does not require direct feedback from the media device 910. Because the antenna system 600 does not have direct knowledge of the channel(s) that are being watched on the media device 910, the antenna system 600 of FIG. 9 can select the best radiation pattern across all or some channels based on the location of the antenna system 600 and the quality of associated wireless channels. In some implementations, the antenna system 600 of FIG. 9 can be placed indoors, such as on a wall or a window in the home. Alternatively, the antenna system 600 can be placed outdoors, such as mounted on the roof of the home.

In some embodiments, the controller 604 can periodically re-scan the broadcast channels to pick the best pattern based on its local scattering environment and the angle of arrival of the signals from the broadcast TV towers. The controller 604 can issue a re-scan based on movement or changes to its local scattering environment. Alternatively or additionally, the controller 604 can issue a re-scan based on detection of local interference, such as FM radio, microwave ovens, LTE cellular radios, or other interfering sources in its local environment. During the mode scanning and selection process, the controller may store a lookup table for each of its radiation modes across all channels.

In some implementations, the controller 604 can re-scan the modes of operation in response to user-input received via an input device. More specifically, the input device can include one or more mechanical interface elements (e.g., push-button) in operative communication with the controller 604. Alternatively or additionally, the input device can include the mobile device 940 that is communicatively coupled to the controller via the bidirectional communication link 930.

Figure 10:
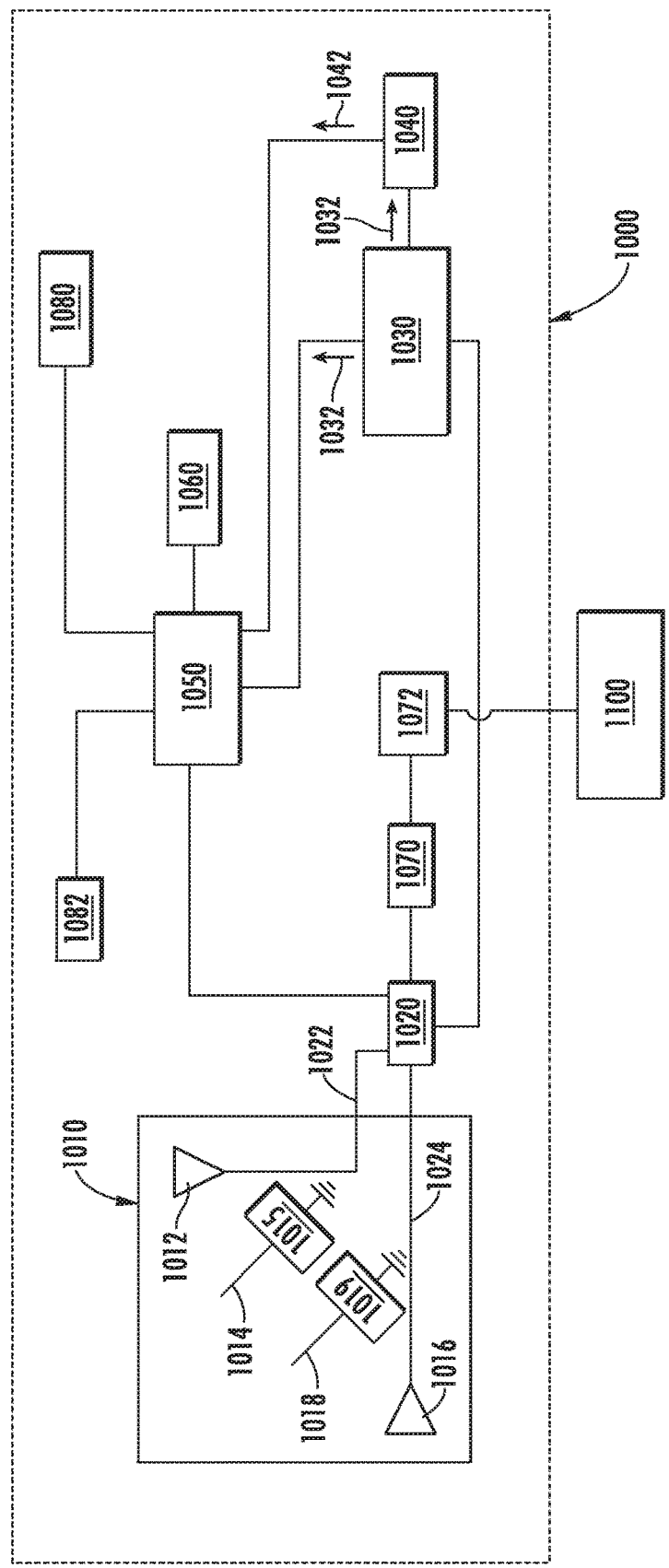
FIG. 10 depicts a block diagram of an antenna system according to example embodiments of the present disclosure.

Referring now to FIG. 10, a block diagram of an antenna system 1000 for a media device 1100 is provided according to example embodiments of the present disclosure. The antenna system 1000 can include a multi-mode active antenna 1010. In some implementations, the active antenna 1010 can be configured to receive radio frequency (RF) waves associated with programming (e.g., shows, news, sporting events, etc.) provided by one or more broadcast stations located within a predetermined proximity of the active antenna 1010. In this manner, the active antenna 1010 can receive programming provided by local broadcast stations.

In some implementations, the active antenna 1010 can include a first antenna 1012 and a first parasitic element 1014 positioned adjacent to the first antenna 1012. As shown, the first parasitic element 1014 can be coupled to ground GND via a first shunt switch 1015. The first parasitic element 1014 can be configured to reradiate RF waves. In this manner, the first parasitic element 1014 can modify a radiation pattern associated with the first antenna 1012.

In some implementations, the active antenna 1010 can include a second antenna 1016 and a second parasitic element 1018 positioned adjacent to the second antenna 1016. As shown, the second parasitic element 101 can be coupled to ground GND via a second shunt switch 1019. The second parasitic element 1018 can be configured to reradiate RF waves. In this manner, the second parasitic element 1018 can modify a radiation pattern associated with the second antenna 1016. As will be discussed below in more detail, the active antenna 1010 is configurable to operate in one of the plurality of modes, with each mode having a distinct radiation pattern.

In some implementations, the antenna system 1000 can include a switching device 1020 that is coupled to active antenna 1010 via one or more conductors. More specifically, the switching device 1020 can be coupled to the first antenna 1012 via a first conductor 1022. In this manner, RF waves received at the first antenna 1012 can be provided to the switch 1020. Additionally, the switching device 1020 can be coupled to the second antenna 1016 via a second conductor 1024. In this manner, RF waves received at the second antenna 1016 can be provided to the switch 1020. As will be discussed in more detail, the switch 1020 is movable between at least two positions to selectively couple the active antenna 1010 to one or more components of the antenna system 1000.

In some implementations, the antenna system 1000 can include a supplemental tuner 1030 that is distinct from a primary tuner (not shown) associated with the media device 1100. For instance, the primary tuner can include a set-top box that is coupled to the media device 1100 via a cable (e.g., a coaxial cable). Alternatively, the primary tuner can be integral with media device 1100. The supplemental tuner 1030 can be configured to process one or more RF waves received via the active antenna 1010. More specifically, the supplemental tuner 1030 can determine a receive signal strength indicator (RSSI) value associated with the one or more RF waves.

In some implementations, the antenna system 1000 can include a demodulator 1040 that is communicatively coupled to the supplemental tuner 1030. The demodulator 1040 can be configured to demodulate one or more signals 1032 received from the supplemental tuner 1030. In this manner, the demodulator 1040 can extract data from the RF waves received at the active antenna 1010. More specifically, the demodulator 1040 can extract one or more video signals indicative of programming (e.g., sports, news, sitcoms, etc.) provided by one or more local broadcasting stations. As will be discussed below in more detail, the antenna system 1000 can include one or more controllers 1050 configured to process signals 1032 output by the supplemental tuner 1030, signals 1042 output by the demodulator 1040, or both.

Figure 11:
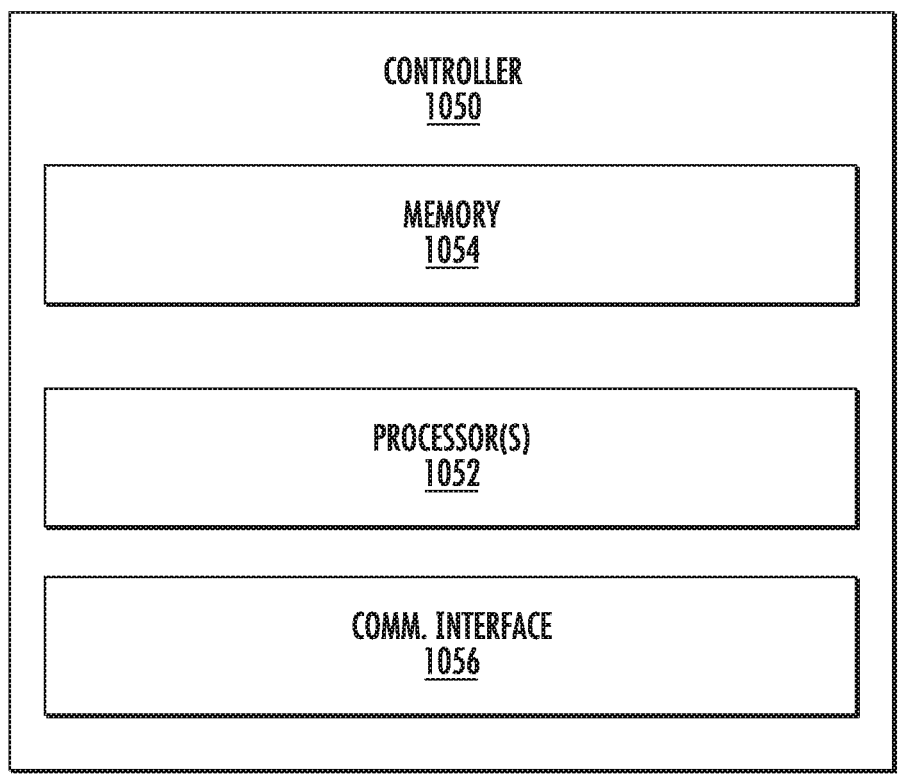
FIG. 11 depicts a block diagram of a controller according to example embodiments of the present disclosure.

In some implementations, the controller 1050 can correspond to any suitable processor-based device, including one or more computing devices. For instance, FIG. 11 illustrates one embodiment of suitable components that may be included within the controller 1050. As shown in FIG. 11, the controller 1050 can include a processor 1052 and associated memory 1054 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 1054 can include memory element(s) including, but not limited to, computer readable medium (e.g., random access memory (RAM)), computer readable non-volatile medium (e.g., flash memory), and/or other suitable memory elements or combinations thereof.

Additionally, as shown in FIG. 11, the controller 1050 can include a communications interface 1056. In some implementations, the communications interface 1056 can include associated electronic circuitry that is used to send and receive data. As such, the communications interface 1056 of the controller 1050 can be used to communicate with at least one of the supplemental tuner 1030 and the demodulator 1040. In this manner, the controller 1050 can receive one or more signals (e.g., output) from the supplemental tuner 1030, the demodulator 1040, or both. In addition, the communications interface 1056 can be used to communicate with the switching device 1020. In this manner, the controller 1050 can control operation of the switching device 1020.

In some implementations, the controller 1050 can configure the active antenna 1010 based, at least in part, on user-input received via an input device 1060. The input device 1060 can include a mechanical interface (e.g., pressbutton) of the antenna system 1000. Alternatively or additionally, the input device 1060 can include a mobile device (e.g., smartphone, tablet, laptop, television remote, etc.). It should be appreciated that the input device 1060 can be communicatively coupled to the controller via any suitable wired and/or wireless (e.g., Wifi, Bluetooth Low Energy, etc.) communication link.

In alternative implementations, the controller 1050 can be configured to determine the selected mode of operation for the active antenna 1010 at predetermined intervals of time. For instance, the controller 1050 can be configured to determine the selected mode of operation every sixty seconds. It should be appreciated, however, that the controller 1050 can be configured to determine the selected mode of operation for any given interval of time.

Prior to the controller 1050 determining the selected mode of operation for the active antenna 1050, the active antenna 1010 is coupled to the supplemental tuner 1030 via the switching device 1020. In some implementations, the controller 1050 can generate a control action associated with moving the switching device 1020 to a first position to couple the active antenna 1010 to the supplemental tuner 1030. In this manner, the supplemental tuner 1030 can receive the RF waves captured via the active antenna 1010. Additionally, the supplemental tuner 1030 can provide an output 1032 to the controller 1050. In some embodiments, the output 1032 can include one or more metrics indicative of performance of the active antenna 1010 in each mode of the plurality of modes. Alternatively or additionally, the demodulator 1040 can provide an output 1042 to the controller 1050. Similar to the output 1032 of supplemental tuner 1030, the output 1042 of the demodulator 1040 can include one or more metrics indicative of performance of the active antenna 1010 in each mode of the plurality of modes.

In some implementations, the metrics can include an RSSI value for one or more channels detected in each of the modes. Alternatively or additionally, the metric(s) can include at least one of a signal-to-noise ratio (SNR), a magnitude error ratio (MER), a bit error rate (BER), a block error rate (BLER), or a packet error rate (PER).

In some implementations, the controller 1050 can determine the selected mode of operation for the active antenna 1010 based, at least in part, on the one or more metrics. More specifically, the controller 1050 can be configured to determine a channel quality indicator (CQI) for one or more channels received during each mode of the plurality of modes. The controller 1050 can, as discussed above with reference to FIG. 8, be further configured to assign a weighting factor for the channel(s) based on a variety of factors. For example, a first channel having a CQI that is greater than a threshold value (e.g., minimum value required to view the channel) can be assigned a lesser weight compared to a second channel having a CQI that is below the threshold value. The controller 1050 can be configured to compute a mode score for each mode of the plurality of modes of operation for the active antenna 810. More specifically, the mode can be based, at least in part, on the CQI for the channels.

In some implementations, the controller 1050 can, as discussed above with reference to FIGS. 7 and 8, be configured to determine the selected mode based on the mode scores determined for each of the plurality of modes. More specifically, the controller 1050 can determine the selected mode as corresponding to a mode having the highest mode score. Once the controller 1050 determines the selected mode, the controller 1050 can configure the active antenna 1010 to operate in the selected mode. More specifically, the controller 1050 can generate one or more control actions associated with configuring the active antenna 1010 in the selected mode.

After the controller 1050 determines the selected mode of operation for the active antenna 1010, the controller 1050 can, in some implementations, generate a control action associated with moving the switch 1020 from a first position to a second position. More specifically, the active antenna 1010 can be decoupled (e.g., not coupled) from the supplemental tuner 1030 when the switch 1020 is in the second position. In this manner, the supplemental tuner 1030 can no longer receive RF signals via the active antenna 1010. It should be appreciated that the active antenna 1010 can be coupled to the media device 1100 when the switch 1020 is in the second position. In this manner, the media device 1100 can receive RF signals via active antenna 1010.

In some implementations, the controller 1050 can be configured to order the modes of operation of the active antenna 1010 based on the number of channels that can be viewed within each mode or other metric indicative of quality and/or distinct channels. For instance, the modes can be ordered to maximize a delta Δ between the number of channels and/or number of different channels viewable within adjacent modes. This concept is illustrated below in Table 1:

| Mode Ordering | | | |
| --- | --- | --- | --- |
| 1 | 2 | 3 | 4 |
| 3 channels | 2 channels | 4 channels | 1 channel |

As shown above in Table 1, 3 channels can be viewed when the active antenna 1010 is operating in the first mode, and 2 channels can be viewed when the active antenna 1010 is operating in the second mode. Additionally, 4 channels can be viewed when the active antenna 1010 is operating in the third mode, and 1 channel can be viewed when the active antenna 1010 is operating in the fourth mode. As such, the controller 1050 can be configured to order the modes to maximize the delta Δ between the number of channels viewable between adjacent modes. For instance, the delta Δ between the number of channels viewable in modes 1 and 3 is less compared to the delta Δ between the number of channels viewable in modes 2 and 3. Additionally the delta Δ between the number of channels viewable in modes 1 and 3 is less compared to the delta Δ between the number of channels viewable in modes 3 and 4. Accordingly, the controller 1050 can be configured to order the modes so that mode 3 is positioned adjacent to modes 2 and 4. More specifically, the modes can be ordered so that mode 3 is positioned between modes 2 and 4. In this manner, the delta Δ between the number of channels viewable between adjacent modes can maximized.

In some implementations, the controller 1050 can cycle through the modes in response to user-input received via the input device 1060. For instance, if the selected mode of operation corresponds to Mode 3, the controller 1050 can reconfigure the active antenna 1010 in Mode 4 in response to receiving user-input via the input device 1060. The delta Δ between the number of channels viewable in Mode 3 versus Mode 4 is 3 channels, which is greater than the delta Δ between Mode 3 versus Modes 1 or 2. If additional user-input is received, the controller 1050 can reconfigure the active antenna 1010 in Mode 1. The delta Δ between the number of channels viewable in Mode 4 versus Mode 1 is 2 channels, which is greater than the delta Δ between Mode 4 versus Modes 2.

In some implementations, the antenna system 1000 can include an amplifier 1070 coupled between the switch 1020 and the media device 1100. In this manner, RF signals provided to the media device 1100 when the switch 1020 is in the second position can be amplified. It should be appreciated that the amplifier 1070 can include any suitable type of amplifier configured to boost a signal strength of the RF signals. For instance, the amplifier 1070 can include a low-noise amplifier.

In some implementations, the antenna system 1000 can include a splitter device 1072 coupled between the amplifier 1070 and the media device 1100. More specifically, the splitter device 1072 can be configured to split a signal received from the amplifier 1070. In some implementations, the splitter device 1072 can split the signal into a first signal and a second signal. The first signal can be provided to the media device 1100. In contrast, the second signal can be provided to various electrical components of the antenna system 1000. In some implementations, the first signal is a power signal. More specifically, a first portion of the power signal can be comprised of RF power. In contrast, the second portion of the power signal can be comprised of direct current (DC) power. In some implementations, the second signal is a power signal comprised of DC power.

In some implementations, the antenna system 1000 can include a positioning system 1080 configured to determine a geographical location of the antenna system 1000. It should be appreciated that any suitable positioning system 1080 can be used to determine the geographical location of the antenna system 1000. For instance, in some implementations, the positioning system 1080 can include a global positioning system. In some implementations, the controller 1050 can be configured to determine the selected mode of operation for the active antenna 1010 based, at least in part, on the geographical location of the antenna system 1000.

In some implementations, the antenna system 1000 can include a motion sensor 1082 configured to determine an orientation of the antenna system 1000. It should be appreciated that any suitable type of motion sensor 1082 can be used to determine the orientation of the antenna system 1000. For instance, in some implementations, the motion sensor 1082 can include an accelerometer configured to determine the orientation of the active antenna 1010. In some implementations, the controller 1050 can be configured to determine the selected mode of operation for the active antenna 1010 based, at least in part, on the orientation of the active antenna 1010.

Figure 12:
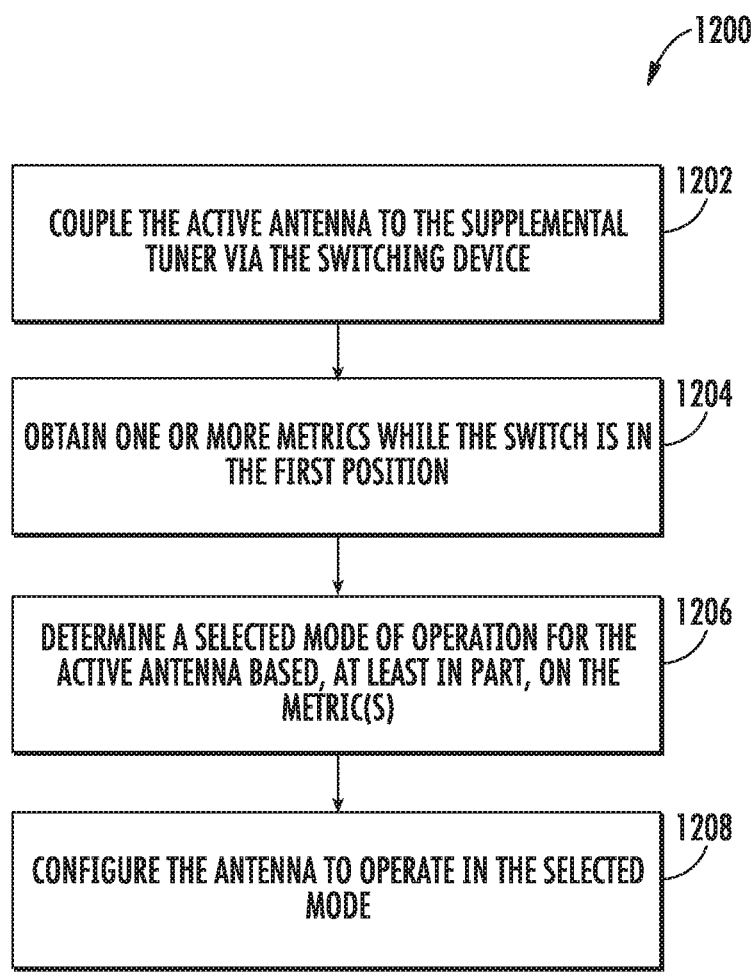
FIG. 12 depicts a flow diagram of a method for configuring an antenna system for use with a media device according to example embodiments of the present disclosure.

Referring now to FIG. 12, a flow diagram of a method for configuring an antenna system for use with a media device is provided according to example embodiments of the present disclosure. The method 1200 may be implemented using, for instance, the antenna system discussed above with reference to FIG. 10. FIG. 12 depicts steps performed in a particular order for purposes of illustration and discussion. Those of ordinary skill in the art, using the disclosures provided herein, will understand that various steps of the method 1200 may be adapted, modified, rearranged, performed simultaneously or modified in various ways without deviating from the scope of the present disclosure.

At (1202), the method 1200 includes coupling the active antenna to the supplemental tuner via the switching device. In some implementations, the one or more controllers can issue a command to the switch over a wired or wireless communication link. More specifically, the command can cause the switch to move to the first position. In this manner, the controller(s) can control operation of the switch.

In some implementations, coupling the active antenna to the supplemental tuner can occur in response to a detected event. For instance, the active antenna can be coupled to the supplemental tuner via the switching device once every sixty seconds. Alternatively, the active antenna can be coupled to the supplemental tuner via the switching device in response to a detected event. For example, the detected event can include user-input received via an input device. In this manner, the active antenna can be coupled to the supplemental tuner via the switching device each time user-input is provided to change the broadcast channel to be displayed via the media device. Alternatively or additionally, the detected event can include receiving data indicating the selected mode is no longer optimal for the channel being viewed via the media device.

At (1204), the method 1200 includes obtaining one or more metrics while the switch is in the first position (e.g., while the active antenna is coupled to the supplemental tuner). More specifically, the metric(s) can indicate operating performance of the active antenna while operating in each of the plurality of modes. In some implementations, the metric(s) can include at least one of a signal-to-noise ratio (SNR), a magnitude error ratio (MER), a bit error rate (BER), a block error rate (BLER), or a packet error rate (PER).

At (1206), the method 1200 includes determining a selected mode of operation for the active antenna based, at least in part on the metric(s) obtained at (1204). In some implementations, the controller of the antenna system can, as discussed above with reference to FIGS. 7 and 8, be configured to determine a CQI for each for one or more channels received during each mode of the plurality of modes. More specifically, the controller can determine the CQI based, at least in part, on the metric(s) obtained at (1204). The controller can be further configured to compute a mode score for each mode of the plurality of modes based, at least in part, on the CQI for the channel or channels received during each mode. In this manner, the controller can be configured to determine the selected mode based on a comparison the scores computed for each of the plurality of modes. For instance, in some implementations, the controller can be configured to determine the selected mode as corresponding to mode having the highest mode score.

At (1208), the method 1200 includes configuring the active antenna to operate in the selected mode. In some implementations, the controller can generate one or more control actions associated with configuring the active antenna in the selected mode.

Figure 13:
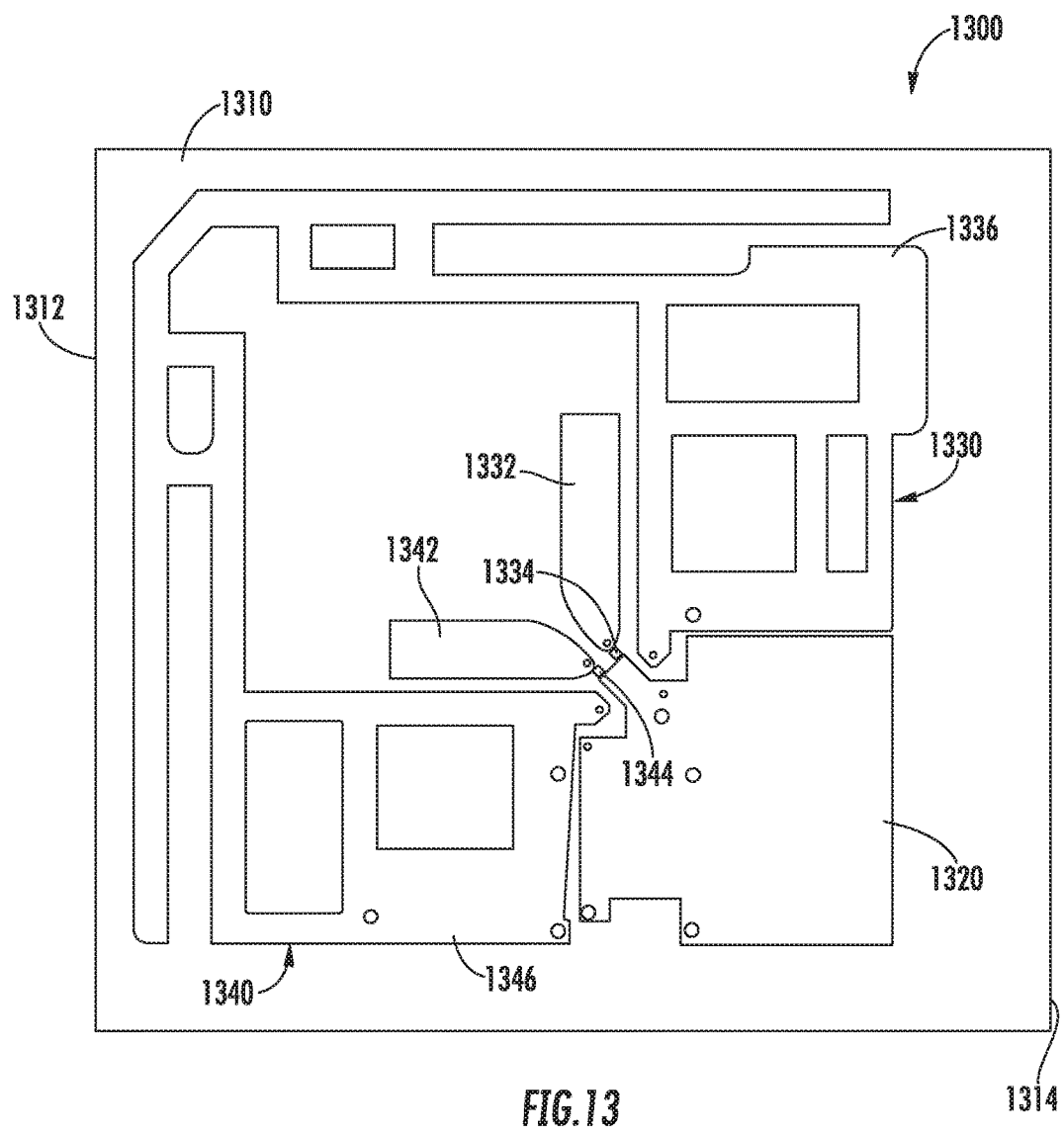
FIG. 13 depicts a schematic view of an active antenna according to example embodiments of the present disclosure.

Referring now to FIG. 13, a schematic of an active antenna 1300 is provided according to example embodiments of the present disclosure. As shown, the active antenna 1300 includes a substrate 1310 and a ground plane 1320 formed on the substrate 1310. In some implementations, the active antenna 1300 includes a first antenna 1330. As shown, the first antenna 1330 can include a first parasitic element 1332 positioned adjacent to the first antenna 1330. In some implementations, the first antenna 1330 can include a first switch 1334 coupled between the first parasitic element 1332 and the ground plane 1320. More specifically, the first switch 1334 can include a multi-port switch configured to open-circuit, short-circuit, or reactively load the first parasitic element 1332.

In some implementations, the antenna 1300 can include a second antenna 1340. As shown, the second antenna 1340 can include a second parasitic element 1342 positioned adjacent to the second antenna 1340. In some implementations, the second antenna 1340 can include a second switch 1344 coupled between the second parasitic element 1342 and the ground plane 1320. More specifically, the second switch 1344 can include a multi-port switch configured to open-circuit, short-circuit, or reactively load the second parasitic element 1342.

In some implementations, both the first switch 1334 and the second switch 1344 can be coupled to a controller (not shown). In some embodiments, the controller can correspond to the controller 1050 of the antenna system 1000 discussed above with reference to FIG. 10. As discussed above, the controller can determine a selected mode for the antenna 1300 and can configure the antenna 1300 (e.g., the first antenna 1330, the second antenna 1340, or both) to operate in the selected mode. More specifically, the controller can generate one or more control actions associated with configuring the first and second switches 1334, 1344 to configure the antenna 1300 in the selected mode.

In some implementations, an arm 1336 of the first antenna 1330 can be connected to an arm 1346 of the second antenna 1340. As shown, the arm 1336 of the first antenna 1330 can connect with the arm 1346 of the second antenna 1340 at an edge 1312 of the substrate 1310 that is opposite an edge 1314 at which the ground plane 1320 is located.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system for use with a media device, the antenna system comprising:
   a multi-mode active antenna configurable to operate in a plurality of modes associated with a UHF band or a VHF band, each mode of the plurality of modes having a distinct radiation pattern;
   a supplemental tuner, the supplemental tuner being separate from a primary tuner associated with the media device;
   a switching device movable between at least two positions, the multi-mode active antenna coupled to the supplemental tuner when the switching device is in a first position, the multi-mode active antenna coupled to the media device when the switching device is in a second position; and
   one or more controllers configured to:
      obtain one or more metrics while the switching device is in the first position, the one or more metrics indicative of performance of the active antenna in each of the plurality of modes;
      determine a selected mode of operation for the active antenna based, at least in part, on the one or more metrics; and
      configure the active antenna to operate in the selected mode.

2. The antenna system of claim 1, further comprising a positioning system configured to determine a geographical location of the antenna system, wherein the one or more controllers are configured to determine the selected mode based at least in part on the geographic location.

3. The antenna system of claim 1, further comprising an accelerometer configured to determine an orientation of the multi-mode active antenna, wherein the controller is configured to determine the selected mode based, at least in part, on the orientation of the multi-mode active antenna.

4. The antenna system of claim 1, wherein the controller is configured to obtain the one or more metrics in response to user input received via an input device.

5. The antenna system of claim 4, wherein the input device includes one or more mechanical interface elements in operative communication with the controller.

6. The antenna system of claim 5, wherein the input device includes a mobile device communicatively coupled to the one or more controllers.

7. The antenna system of claim 1, further comprising a demodulator communicatively coupled to the supplemental tuner, the demodulator configured to demodulate one or more signals received from the supplemental tuner.

8. The antenna system of claim 1, further comprising a low noise amplifier coupled between the switching device and the media device.

9. The antenna system of claim 1, wherein the media device includes a television.

10. The antenna system of claim 1, wherein the multi-mode active antenna includes:
    a first antenna; and
    a first parasitic element positioned adjacent the first antenna.

11. The antenna system of claim 10, further comprising:
    a second antenna; and
    a second parasitic element positioned adjacent the second antenna.

12. The antenna system of claim 11, wherein an arm of the first antenna is connected to an arm of the second antenna.

13. A method of configuring an antenna system for use with a media device, the antenna system comprising a multi-mode active antenna, a switching device, and a supplemental tuner that is separate from a primary tuner associated with the media device, the method comprising:
    coupling the active antenna to the supplemental tuner via the switching device;
    obtaining, by one or more controllers of the antenna system, one or more metrics while the active antenna is coupled to the supplemental tuner, the one or more metrics indicative of performance of the active antenna in each of a plurality of modes associated with a UHF band or a VHF band, wherein each mode of the plurality of modes has a distinct radiation pattern;
    determining, by the one or more controllers, a selected operating mode for the active antenna based, at least in part, on the one or more metrics; and
    configuring, by the one or more controllers, the active antenna to operate in the selected operating mode.

14. The method of claim 13, further comprising decoupling the active antenna from the supplemental tuner via the switching device.

15. The method of claim 14, wherein when the active antenna is decoupled from the supplemental tuner, the active antenna is coupled to the media device via the switching device.

16. The method of claim 14, wherein decoupling the active antenna from the supplemental tuner occurs subsequent to determining the selected operating mode for the active antenna.

17. The method of claim 13, wherein coupling the active antenna to the supplemental tuner occurs in response to receiving user-input from an input device.

18. The method of claim 17, wherein the user-input indicates selection of a channel to be viewed via the media device.

19. An active antenna operable in a plurality of modes, each mode of the plurality of modes having a distinct radiation pattern, the active antenna comprising:
    a substrate;
    a first antenna positioned on the substrate adjacent to a ground plane, the first antenna configured for multiple resonances in a UHF band or a VHF band;
    a first parasitic element positioned adjacent to the first antenna;
    a first switch coupled between the first parasitic element and the ground plane, the first switch configured to open-circuit, short-circuit, or reactively load the first parasitic element;
    a second antenna positioned on the substrate adjacent to the ground plane, the second antenna configured for multiple resonances in the UHF band or the VHF band;
    a second parasitic element positioned adjacent to the second antenna; and
    a second switch coupled between the second parasitic element and the ground plane, the second switch configured to open-circuit, short-circuit, or reactively load the second parasitic element; and
    wherein an arm of the first antenna is connected to an arm of the second antenna.

* * * * *